(12) United States Patent
Genshaft et al.

(10) Patent No.: US 10,380,015 B2
(45) Date of Patent: Aug. 13, 2019

(54) LOGICAL ADDRESS RANGE MAPPING FOR STORAGE DEVICES

(71) Applicant: Western Digital Technologies, Inc, San Jose, CA (US)

(72) Inventors: Igor Genshaft, Bat Yam (IL); Marina Frid, Jerusalem (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 152 days.

(21) Appl. No.: 15/640,362

(22) Filed: Jun. 30, 2017

(65) Prior Publication Data
US 2019/0004941 A1    Jan. 3, 2019

(51) Int. Cl.
*G06F 13/00* (2006.01)
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0655* (2013.01); *G06F 3/0688* (2013.01); *G06F 2212/7201* (2013.01)

(58) Field of Classification Search
None
See application file for complete search history.

(56) References Cited

U.S. PATENT DOCUMENTS

| 8,489,817 | B2 | 7/2013 | Flynn et al. |
| 9,244,833 | B2 | 1/2016 | Cheng |
| 2002/0046216 | A1* | 4/2002 | Yamazaki ............. G06F 3/0607 |
| 2010/0318762 | A1* | 12/2010 | Malyugin ........... G06F 12/1027 711/207 |
| 2013/0339567 | A1* | 12/2013 | Carpentier .......... G06F 11/0709 711/4 |
| 2016/0048354 | A1* | 2/2016 | Walsh ................. G06F 12/0246 711/103 |
| 2017/0161205 | A1* | 6/2017 | Leggette ............. G06F 12/1009 |
| 2019/0057041 | A1* | 2/2019 | Ha ...................... G06F 12/1018 |

* cited by examiner

*Primary Examiner* — Sean D Rossiter
(74) *Attorney, Agent, or Firm* — Kunzler Bean & Adamson, PC

(57) ABSTRACT

Apparatus, systems, methods, and computer program products are disclosed for logical address range mapping for storage devices. A system includes a set of non-volatile memory elements accessible using a set of physical addresses. A system includes a controller for a set of non-volatile memory elements. A controller is configured to maintain a hierarchical data structure comprising a plurality of levels for mapping logical addresses to a set of physical address. A controller is configured to receive an input/output (I/O) request. A controller is configured to translate a logical address for an I/O request to a physical address utilizing a largest mapped logical address range that includes the logical address in a hierarchical data structure. A level includes one or more mappings between logical address ranges and physical address ranges at a range size for the level.

20 Claims, 19 Drawing Sheets

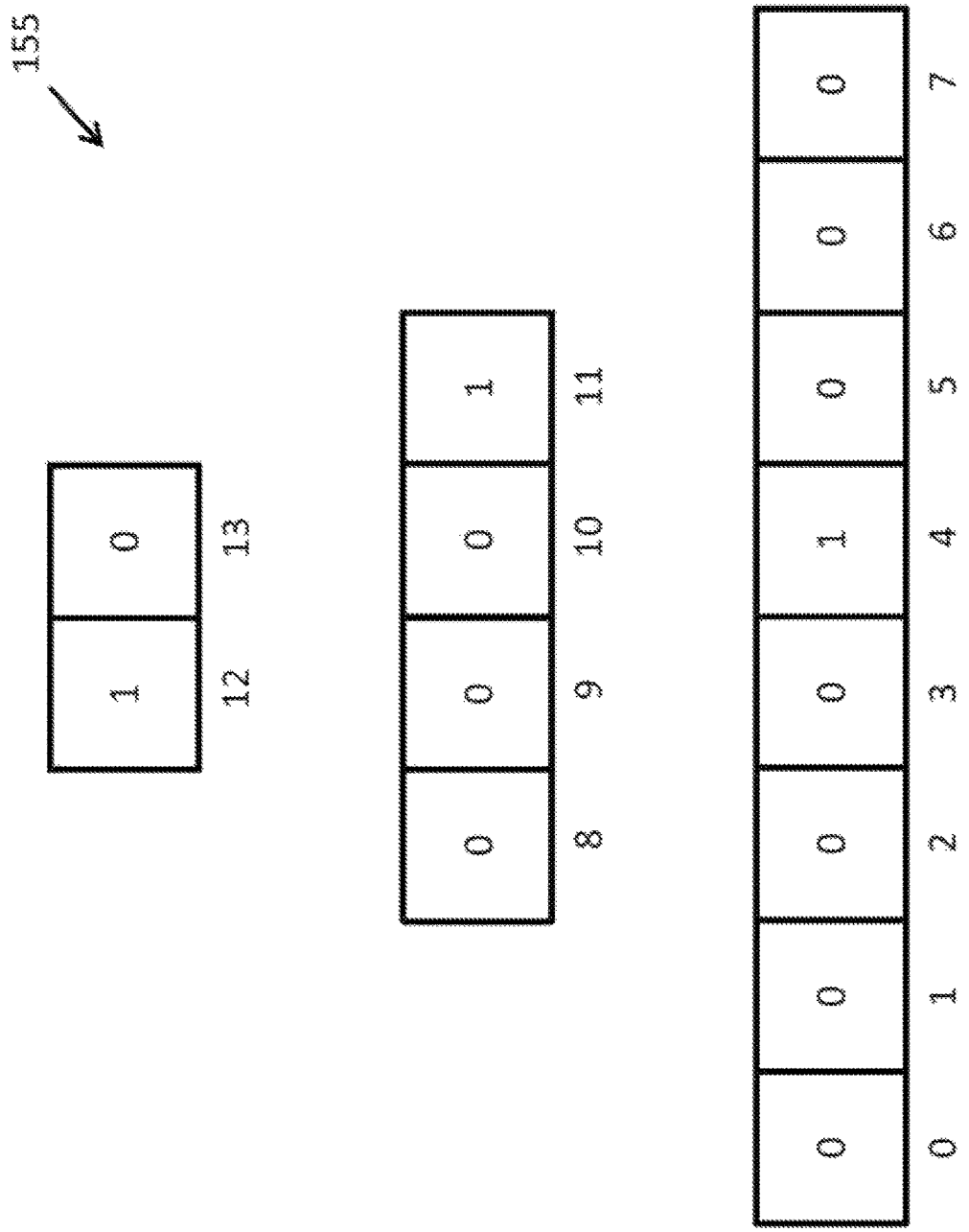

LOGICAL ADDRESS RANGE MAPPING FOR STORAGE DEVICES

TECHNICAL FIELD

The present disclosure, in various embodiments, relates to storage operations and more particularly relates to logical address range mapping for storage devices.

BACKGROUND

Many storage systems and/or devices use logical addresses to securely manage memory so that applications and/or programs do not have direct access to physical memory, to provide wear leveling, or the like. The logical addresses are typically mapped to physical addresses so that a processor can access the physical addresses to perform input/output (I/O) operations on the data stored therein. Conventional techniques to locate logical addresses for corresponding physical addresses can cause some storage systems and/or devices to experience one or more latency issues.

SUMMARY

Systems are presented for logical address range mapping for storage devices. In one embodiment, a system includes a set of non-volatile memory elements including a set of physical addresses and a controller including a set of processing devices that execute instructions in one or more applications. The instructions may cause the controller to perform operations including maintaining a hierarchical data structure comprising a plurality of levels for mapping logical addresses to the set of physical address, receiving an input/output (I/O) request, and translating a logical address for the I/O request to a physical address utilizing a largest mapped logical address range that includes the logical address in the hierarchical data structure. In some embodiments, a level includes one or more mappings between logical address ranges and physical address ranges at a range size for the plurality of levels.

Apparatuses are presented for logical address range mapping for storage devices. In one embodiment, an apparatus includes means for maintaining a hierarchical data structure comprising a plurality of levels for mapping logical addresses to a set of physical address in non-volatile memory. An apparatus, in certain embodiments, includes means for maintaining a bitmap for a hierarchical data structure. A level may include one or more mappings between logical address ranges and physical address ranges at a range size for a plurality of levels. A bitmap, in various embodiments, may track largest mapped logical address ranges for logical addresses in a plurality of levels.

Also presented are methods for logical address range mapping for storage devices. A method, in one embodiment, includes maintaining a hierarchical data structure comprising a plurality of levels for mapping logical addresses to a set of physical address in non-volatile memory. A method, in certain embodiments, includes maintaining a bitmap for a hierarchical data structure. A level may include one or more mappings between logical address ranges and physical address ranges at a range size for a plurality of levels. Further, a bitmap may track largest mapped logical address ranges for logical addresses in a plurality of levels.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIGS. 6A and 6B are schematic blocks illustrating one example of the hierarchical data structure and bitmap for the hierarchical data structure, respectively, at an initial time T0;

DETAILED DESCRIPTION

Figure 1A:
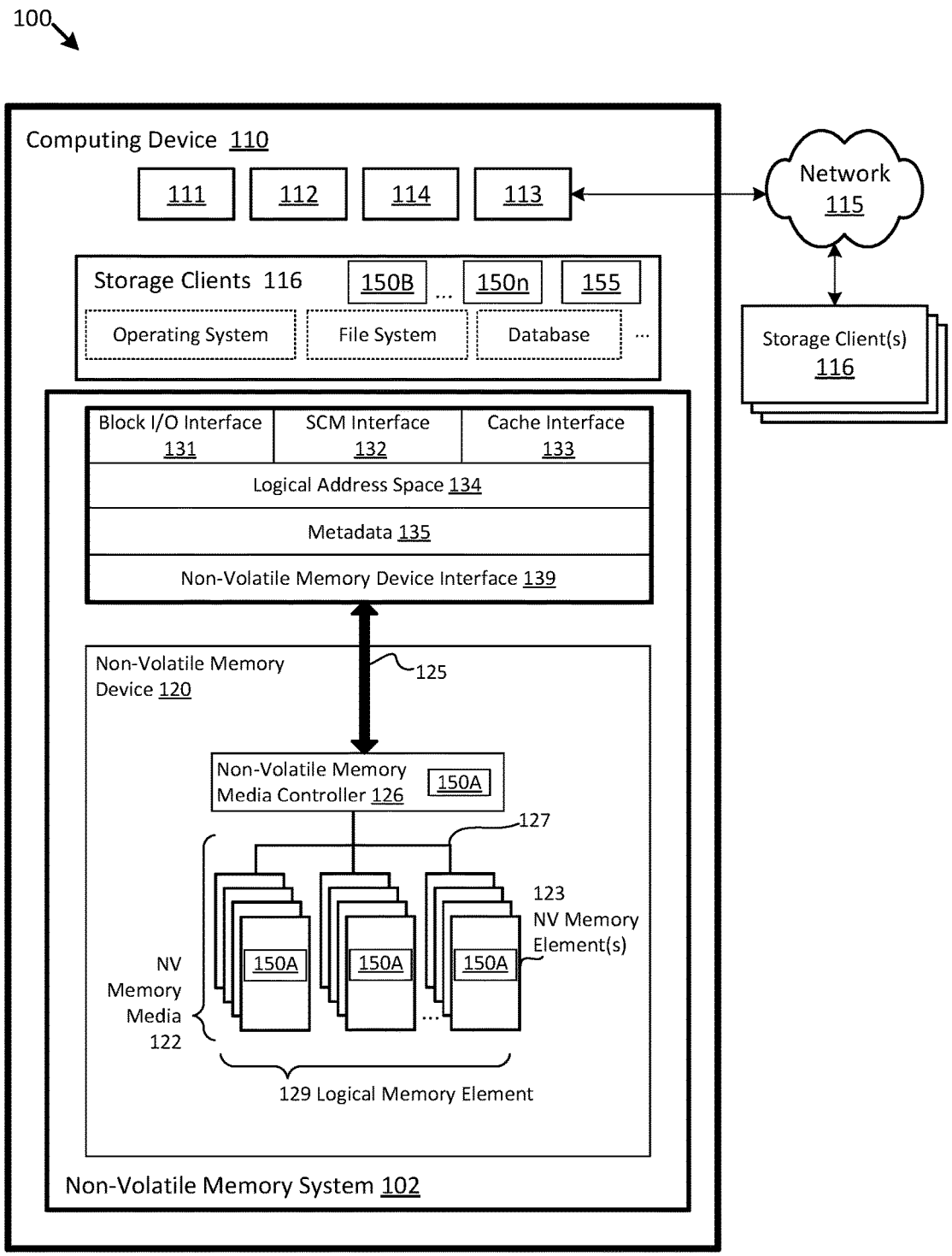
FIG. 1A is a schematic block diagram illustrating one embodiment of a system for logical address range mapping for storage devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" may mean "one or more," unless expressly specified otherwise. The term "sets" may mean multiples of or a plurality of "one or mores," "ones or more," and/or "ones or mores" consistent with set theory, unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, may be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a set of hierarchical data structures 150A, 150B, . . . 150n (also simply referred to individually, in various groups, or collectively, as hierarchical data structure(s) 150) mapping logical address ranges to physical address ranges for a non-volatile memory device 120. Each hierarchical data structure 150 may represent a level or layer in a hierarchical order. Each hierarchical data structure 150 may include mappings between logical addresses and physical addresses for the non-volatile memory device 120 described below.

The hierarchical data structure 150 may be part of and/or in communication with a non-volatile memory media controller 126, a non-volatile memory element 123, a device driver, or the like. The hierarchical data structure 150 may function on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer-readable storage medium 114. The computer-readable storage medium 114 may comprise executable instructions configured to cause the computing device 110 (e.g., processor 111) to perform steps of one or more of the methods disclosed herein. Alternatively, or in addition, the hierarchical data structure 150 may be embodied as one or more computer-readable instructions stored on the non-transitory storage medium 114.

The non-volatile memory system 120, in the depicted embodiment, includes the hierarchical data structure 150A. The hierarchical data structure 150A or level, in various embodiments, may provide mappings between individual logical addresses and physical addresses for the non-volatile memory device 120 at a lowest level, as discussed elsewhere herein. The hierarchical data structure(s) 150B, . . . 150*n* or level(s), in some embodiments, map ranges of logical addresses to ranges of physical addresses at one or more higher levels in the hierarchical order, as discussed elsewhere herein. The hierarchical data structure(s) 150 allow the physical address/addresses of data stored in the non-volatile memory device 120 to be located more efficiently than at least some conventional location techniques, as discussed in the Background section of this application.

In one embodiment, the hierarchical data structure 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the hierarchical data structure 150 may comprise executable software code, such as a device driver or the like, stored on the computer-readable storage medium 114 for execution on the processor 111. In a further embodiment, the hierarchical data structure 150 may include a combination of both executable software code and logic hardware.

As further illustrated, the system 100, in various embodiments, includes a bitmap 155 for the hierarchical data structure 150. A bitmap 155 may provide a map and/or key to identifying valid and/or invalid logical address ranges in one or more levels of the hierarchical data structure 150, as discussed elsewhere herein.

In one embodiment, a device driver or other executable application, via a bus 125 or the like, may utilize the hierarchical data structure 150 to lookup and/or locate one or more physical addresses corresponding to the mapped logical address ranges in the hierarchical data structure 150. Further, a device driver and/or one or more storage clients 116 (also simply referred to individually, in various groups, or collectively, as storage client(s) 116), via the bus 125, may lookup and/or locate one or more physical addresses corresponding to the mapped logical address/addresses in the hierarchical data structure(s) 150B, . . . 150*n* alone or in conjunction with the bitmap 155. Accordingly, the hierarchical data structure 150 and/or bitmap 155, in some embodiments, may comprise and/or be in communication with one or more direct memory access (DMA) modules, remote DMA modules, bus controllers, bridges, buffers, and so on to facilitate locating physical addresses.

According to various embodiments, a non-volatile memory controller 126 in communication with the hierarchical data structure 150 and/or bitmap 155 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139. In some embodiments, the non-volatile memory device interface 139 is configured to transfer data, commands, and/or queries to the non-volatile memory media controller 126 over a bus 125, as described above.

Figure 1B:
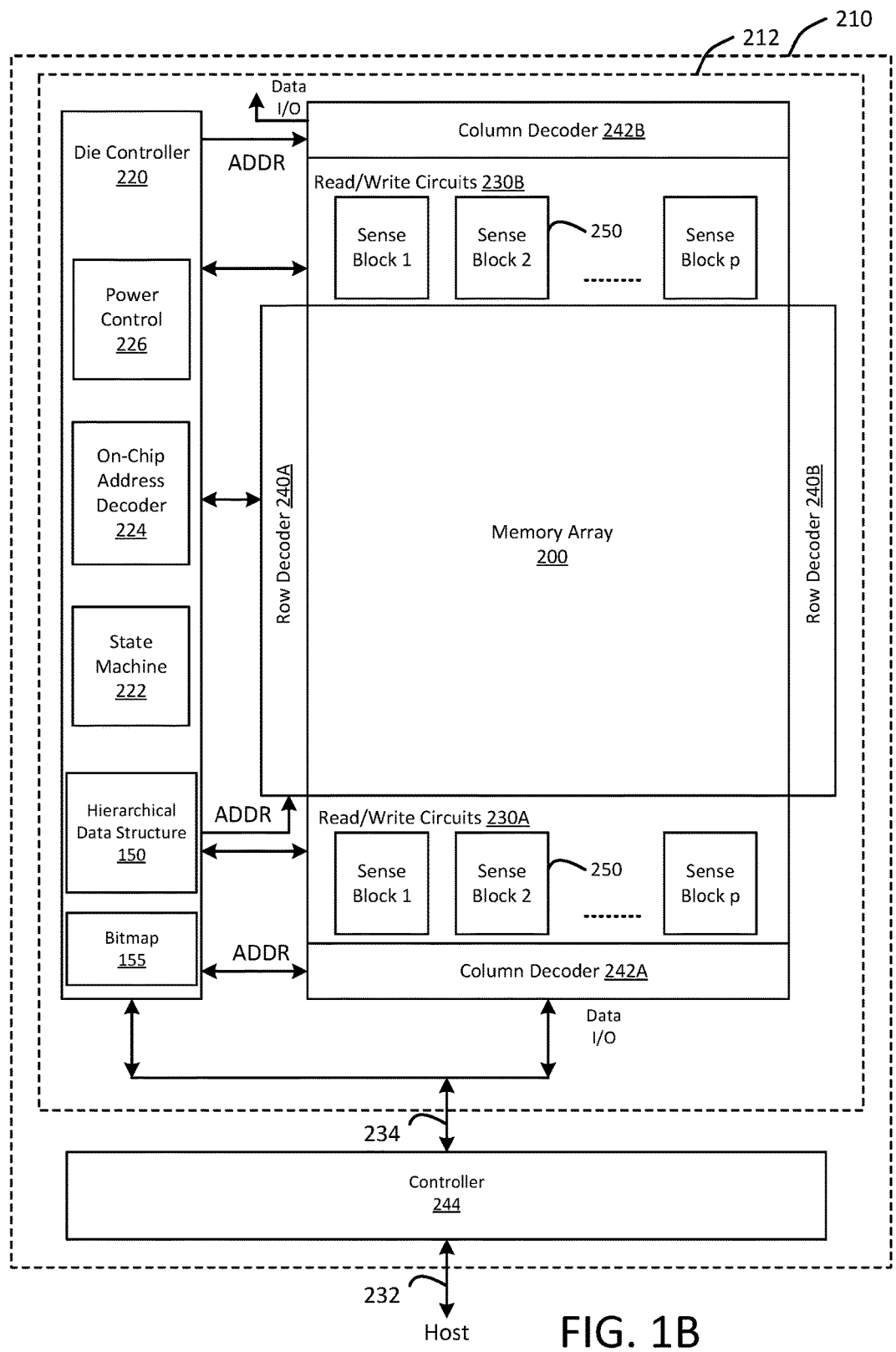
FIG. 1B is a schematic block diagram illustrating another embodiment of a system for logical address range mapping for storage devices.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation may include multiple chips 212.

Die controller 220, in one embodiment, cooperates with the read/write circuits 230A/230B to perform memory operations on the memory array 200. The die controller 220, in certain embodiments, includes a hierarchical data structure 150, a bitmap 155, a state machine 222, and an on-chip address decoder 224. In one embodiment, the state machine 222 comprises the hierarchical data structure 150 and/or the bitmap 155. In a further embodiment, the controller 244 comprises the hierarchical data structure 150 and/or the bitmap 155. In various embodiments, one or more of the sense blocks 250 comprise the hierarchical data structure 150 and/or the bitmap 155.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. In certain embodiments, the state machine 222 includes an embodiment of the hierarchical data structure 150 and/or the bitmap 155.

The hierarchical data structure 150 and/or the bitmap 155, in certain embodiments, is/are embodied as software in a device driver, hardware in a device controller 244, and/or hardware in a die controller 220 and/or state machine 222. In one embodiment, one or any combination of die controller 220, decoder circuit 224, state machine circuit 222, decoder circuit 242A, decoder circuit 242B, decoder circuit 240A, decoder circuit 240B, read/write circuits 230A, read/write circuits 230B, and/or controller 244 may be referred to as one or more managing circuits for the hierarchical data structure 150 and/or the bitmap 155.

Figure 2:
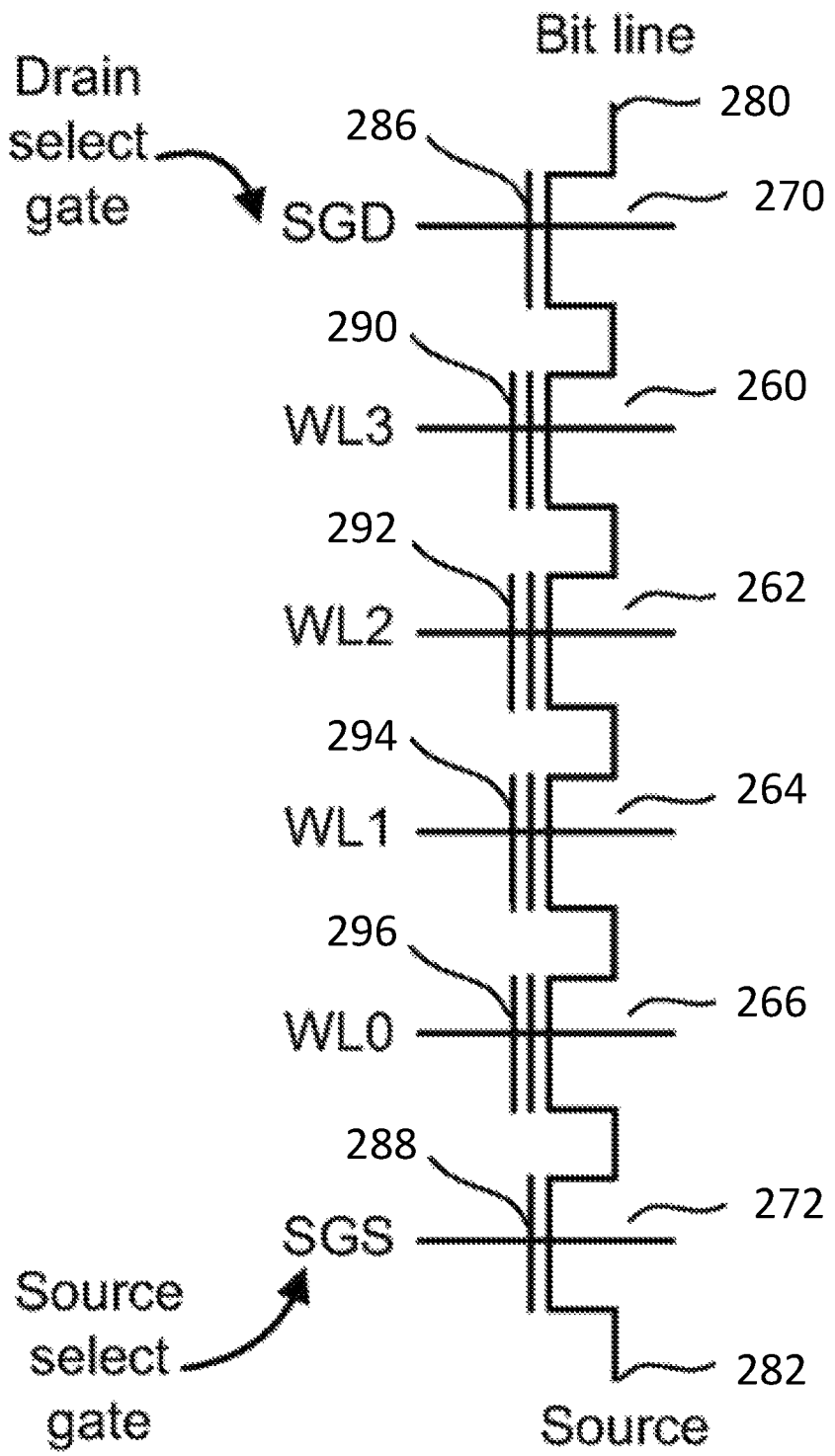
FIG. 2 is a schematic block diagram illustrating one embodiment of a string of storage cells.

FIG. 2 depicts one embodiment of a NAND string comprising a plurality of storage elements. The NAND string depicted in FIG. 2, in some embodiments, includes four transistors 260, 262, 264, 266 connected in series and located between a first select transistor 270 and a second select transistor 272. In some embodiments, a transistor 260, 262, 264, 266 includes a control gate and a floating gate. A control gate 290, 292, 294, 296, in one embodiment, is connected to, or comprises a portion of, a word line. In a further embodiment, a transistor 260, 262, 264, 266 is a storage element, storage cell, or the like, also referred to as a memory cell. In some embodiments, a storage element may include multiple transistors 260, 262, 264, 266.

The first select transistor 270, in some embodiments, gates/connects the NAND string connection to a bit line 280 via a drain select gate SGD. The second select transistor 272, in certain embodiments, gates/connects the NAND string connection to a source line 282 via a source select gate SGS. The first select transistor 270, in a further embodiment, is controlled by applying a voltage to a corresponding select gate 286. The second select transistor 272, in some embodiments, is controlled by applying a voltage to corresponding select gate 288.

As shown in FIG. 2, the source line 282, in one embodiment, is connected to the sources of each transistor/storage cell 260, 262, 264, 266 in the NAND string. The NAND string, in some embodiments, may include some storage elements 260, 262, 264, 266 that have been programmed and some storage elements 260, 262, 264, 266 that have not been programmed. As described in more detail below, the hierarchical data structure 150 controls whether temperature compensation applied to a storage device, such as a NAND string, uses a fixed temperature or a current temperature.

Figure 3:
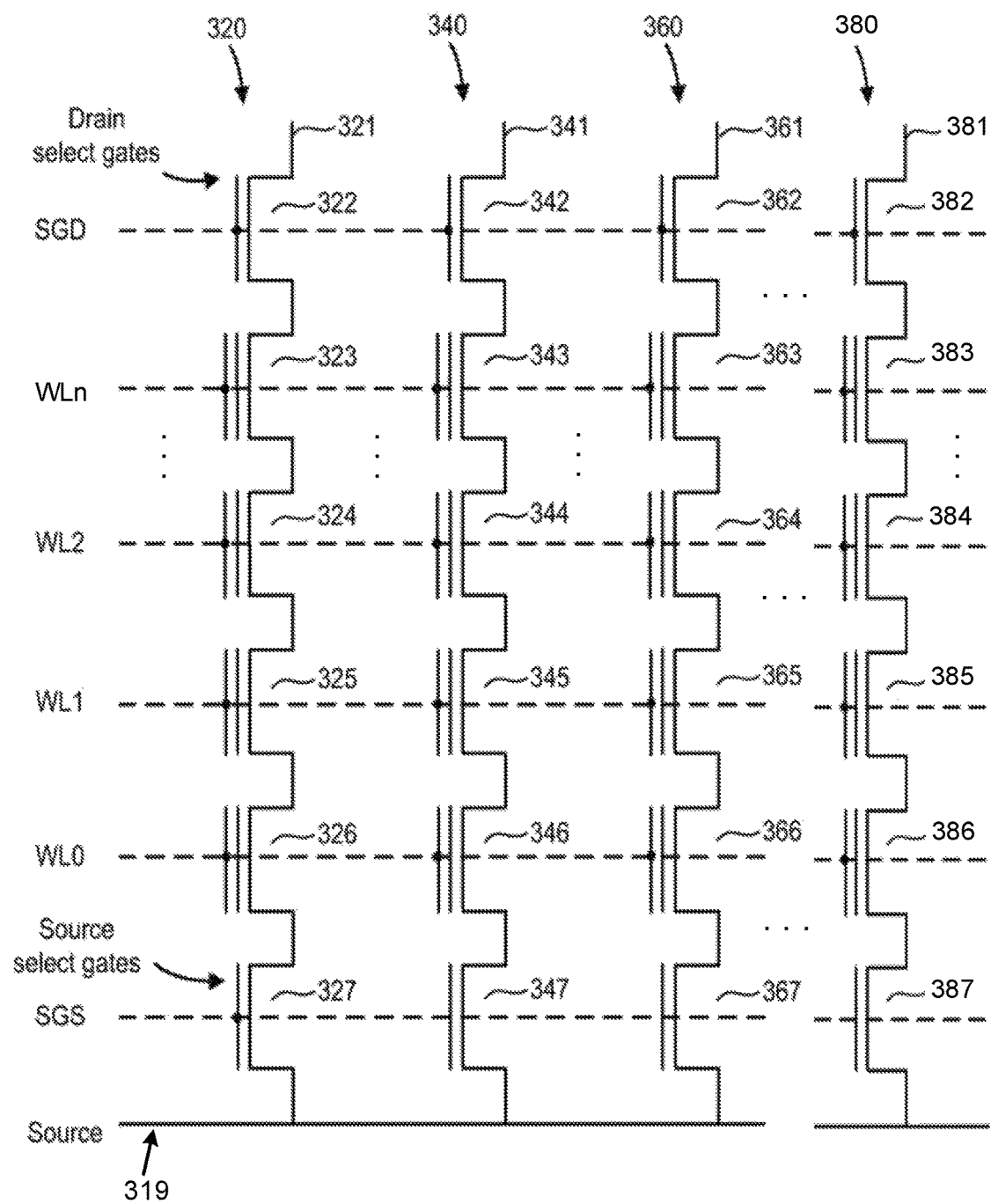
FIG. 3 is a schematic block diagram illustrating one embodiment of an array of storage cells.

FIG. 3 is a circuit diagram depicting a plurality of NAND strings 320, 340, 360, 380. An architecture for a flash memory system using a NAND structure may include several NAND strings 320, 340, 360, 380. For example, FIG. 3 illustrates NAND strings 320, 340, 360, 380 in a memory array 200 that includes multiple NAND strings 320, 340, 360, 380. In the depicted embodiment, each NAND string 320, 340, 360, 380 includes drain select transistors 322, 342, 362, 382, source select transistors 327, 347, 367, 387, and storage elements 323-326, 343-346, 363-366, 383-386. While four storage elements 323-326, 343-346, 363-366, 383-386 per NAND string 320, 340, 360, 380 are illustrated for simplicity, some NAND strings 320, 340, 360, 380 may include any number of storage elements, e.g., thirty-two, sixty-four, or the like storage elements.

NAND strings 320, 340, 360, 380, in one embodiment, are connected to a source line 319 by source select transistors 327, 347, 367, 387. A selection line SGS may be used to control the source side select transistors. The various NAND strings 320, 340, 360, 380, in one embodiment, are connected to bit lines 321, 341, 361, 381 by drain select transistors 322, 342, 362, 382. The drain select transistors 322, 342, 362, 382 may be controlled by a drain select line SGD. In some embodiments, the select lines do not necessarily need to be in common among the NAND strings 320, 340, 360, 380; that is, different select lines may be provided for different NAND strings 320, 340, 360, 380.

As described above, each word line WL0-WLn comprises one or more storage elements 323-383, 324-384, 325-385, 326-386. In the depicted embodiment, each bit line 321, 341, 361, 381 and the respective NAND string 320, 340, 360, 380 comprise the columns of the memory array 200, storage block, erase block, or the like. The word lines WL0-WLn, in some embodiments, comprise the rows of the memory array 200, storage block, erase block, or the like. Each word line WL0-WLn, in some embodiments, connects the control gates of each storage element 323-383, 324-384, 325-385, 326-386 in a row. Alternatively, the control gates may be provided by the word lines WL0-WLn themselves. In some embodiments, a word line WL0-WLn may include tens, hundreds, thousands, millions, or the like of storage elements 323-383, 324-384, 325-385, 326-386.

In one embodiment, each storage element 323-326, 343-346, 363-366, 383-386 is configured to store data. For example, when storing one bit of digital data, the range of possible threshold voltages ("VTH") of each storage element 323-326, 343-346, 363-366, 383-386 may be divided into two ranges which are assigned logical data "1" and "0." In one example of a NAND type flash memory, the VTH may be negative after the storage elements 323-326, 343-346, 363-366, 383-386 are erased, and defined as logic "1." In one embodiment, the VTH after a program operation is positive and defined as logic "0."

When the VTH is negative and a read is attempted, in some embodiments, storage elements 323-326, 343-346, 363-366, 383-386 will turn on to indicate logic "1" is being stored. When the VTH is positive and a read operation is attempted, in a further embodiment, a storage element will not turn on, which indicates that logic "0" is stored. Each storage element 323-383, 324-384, 325-385, 326-386 may also store multiple levels of information, for example, multiple bits of digital data. In such an embodiment, the range of VTH value is divided into the number of levels of data. For example, if four levels of information may be stored in each storage element 323-326, 343-346, 363-366, 383-386, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements 323-326, 343-346, 363-366, 383-386 and the threshold voltage ranges of the storage elements 323-326, 343-346, 363-366, 383-386 depends upon the data encoding scheme adopted for the storage elements 323-326, 343-346, 363-366, 383-386.

In some embodiments, temperature compensation used for sensing data on the storage elements 323-326, 343-346, 363-366, 383-386 may be noisy resulting in reduced sensing accuracy. In such an embodiment, the hierarchical data structure 150 may selectively hold temperature compensation used for sensing data on the storage elements 323-326, 343-346, 363-366, 383-386 based on a command indicating to hold the temperature compensation.

Figure 4:
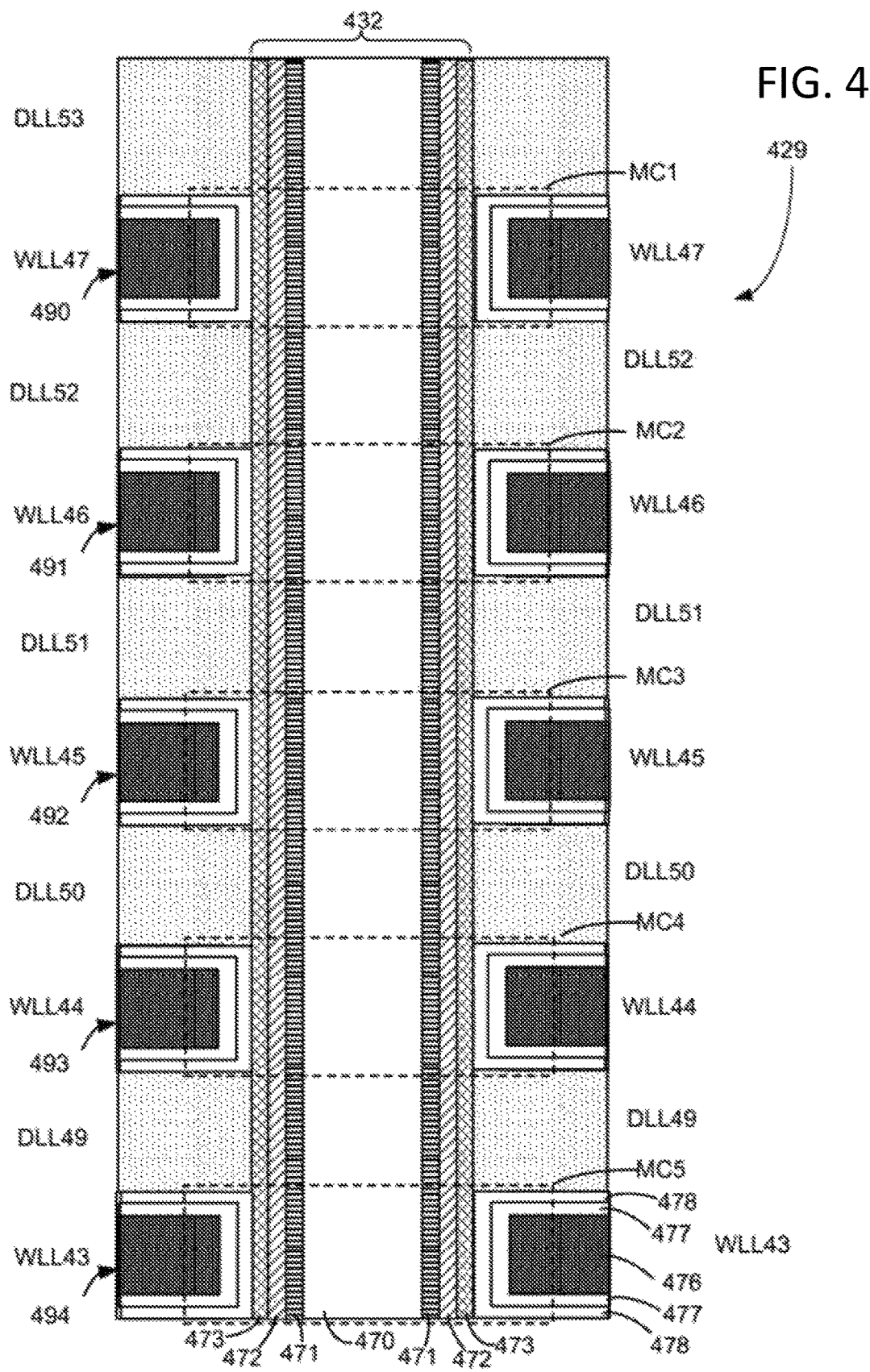
FIG. 4 illustrates one embodiment of a 3D, vertical NAND flash memory structure.

FIG. 4 illustrates one embodiment of a cross-sectional view of a 3D, vertical NAND flash memory structure 429 or string 429. In one embodiment, the vertical column 432 is round and includes four layers; however, in other embodiments more or less than four layers may be included and other shapes may be used (e.g., a "U" shape instead of an "I" shape or the like). In one embodiment, a vertical column 432 includes an inner core layer 470 that is made of a dielectric, such as SiO2. Other materials may also be used. Surrounding inner core 470 is polysilicon channel 471. Materials other than polysilicon may also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is a shared charge trapping layer 473, such as (for example) Silicon Nitride. Other materials and structures may also be used. The technology described herein is not limited to any particular material or structure.

FIG. 4 depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide (SiO2) layer 478. The physical interaction of the word line layers with the vertical column forms the memory cells. Thus, a memory cell, in one embodiment, comprises channel 471, tunneling dielectric 472, charge trapping layer 473 (e.g., shared with other memory cells), blocking oxide layer 478, aluminum oxide layer 477 and word line region 476. In some embodiments, the blocking oxide layer 478 and aluminum oxide layer 477, may be replaced by a single layer of material with insulating properties or by more than 2 layers of different material with insulating properties. Furthermore, the materials used are not limited to silicon dioxide (SiO2) or aluminum oxide. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge trapping layer 473 which is associated with the memory cell. These electrons are drawn into the charge trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Storage cells in the same location or position in different memory structures 429 (e.g., different NAND strings 429) on different bit lines, in certain embodiments, may be on the same word line. Each word line may store one page of data, such as when 1-bit of data is stored per cell (SLC); two pages of data, such as when 2-bits of data are stored per cell (MLC); three pages of data, such as when 3-bits of data are stored per cell (TLC); four pages of data, such as when 4-bits of data are stored per cell (QLC); or another number of pages of data.

In the depicted embodiment, a vertical, 3D NAND flash memory structure 429 comprises an "I" shaped memory structure 429. In other embodiments, a vertical, 3D NAND flash memory structure 429 may comprise a "U" shaped structure, or may have another vertical and/or stacked architecture. In certain embodiments, four sets of strings 429 (e.g., four sets of 48 word lines, or another predefined number of word lines) may form an erase block, while in other embodiments, fewer or more than four sets of strings 429 may form an erase block. As may be appreciated, any suitable number of storage cells may be part of a single string 429. In one embodiment, a single string 429 includes 48 storage cells.

Figure 5A:
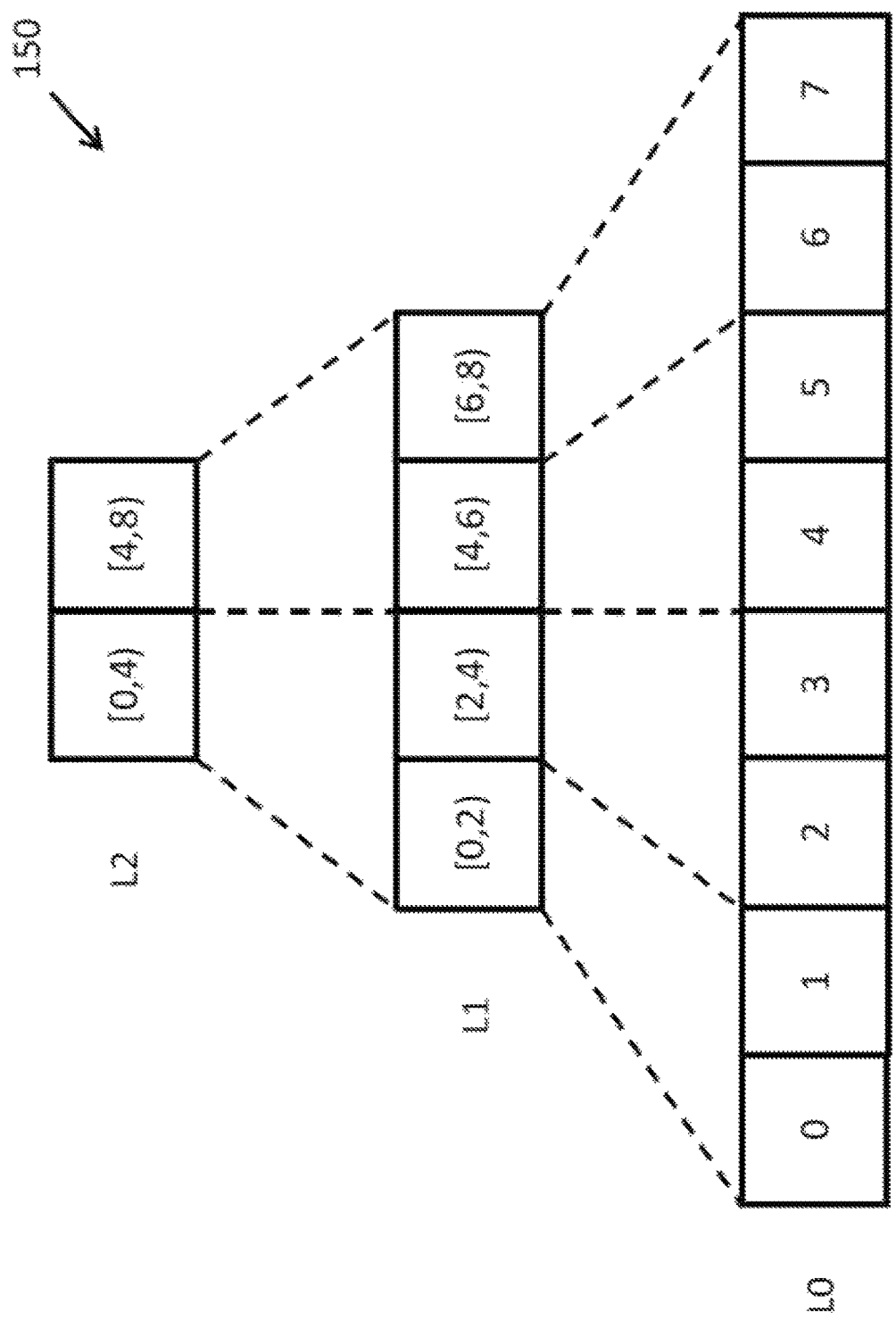
FIGS. 5A and 5B are schematic block diagrams illustrating one embodiment of a hierarchical data structure and bitmap for the hierarchical data structure, respectively.

FIG. 5A depicts one embodiment of a hierarchical data structure 150. The hierarchical data structure 150 may include any quantity of levels that may allow and/or facilitate locating one or more physical addresses in the non-volatile memory 120. At least in the illustrated embodiment, the overall hierarchical data structure 150 includes three (3) levels (e.g., L0-L2), which may represent the hierarchical data structure 150A (e.g., L0), hierarchical data structure 150B (e.g., L1), and hierarchical data structure 150n (e.g., L2).

In general, the hierarchical data structure 150 may map a set of logical addresses to a corresponding set of physical addresses. As shown, the hierarchical data structure 150 maps eight (8) logical addresses to eight (8) corresponding physical addresses, although other quantities are possible and contemplated herein.

With reference to level L1 in the depicted embodiment, level L1 includes four (4) logical address ranges (e.g., [0,2), [2,4), [4,6), and [6,8)). The levels that are adjacent to level L1 include eight (8) ranges of logical addresses (e.g., level L0) and two (2) ranges of logical addresses (e.g., level L2). For instance, level L0 includes eight (8) individual physical address and level L2 includes two (2) ranges of logical addresses (e.g., [0,4) and [4,8)), among other quantities and/or ranges that are possible and contemplated herein.

At least in the illustrated embodiment, the hierarchy increases from the base level (e.g., L0) to a top level (e.g., L2). The notation used herein to denote a range includes [n,m), in which a bracket indicates that the numeral is included in the range and a parenthetical indicates that the numeral is excluded from the range. For instance, the range represented by [4,8) includes the numerals 4-7, but excludes the numeral eight (8), for a quantity/range of four (4) logical addresses.

As further illustrated, each level includes the total logical address range of the level below it. For instance, level L1 includes the logical address ranges [0,2), [2,4), [4,6), and [6,8), which includes the range of logical addresses 0-7, which is the entire logical address range of level 0 scaled by a factor of two (2). Specifically, the level L1 block with logical addresses [0,2) corresponds to the blocks with logical addresses 0 and 1 at level L0, the level L1 block with logical addresses [2,4) corresponds to the blocks with logical addresses 2 and 3 at level L0, the level L1 block with logical addresses [4,6) corresponds to the blocks with logical addresses 4 and 5 at level L0, and the level L1 block with logical addresses [6,8) corresponds to the blocks with logical addresses 6 and 7 at level L1.

Similarly, level L2 includes the logical address ranges [0,4) and [4,8), which also includes the logical address ranges [0,2), [2,4), [4,6), and [6,8) (and the range of logical addresses 0-7), which is the entire range of level L1 scaled by a factor of two (2) (and level 0 scaled by a factor of four (4)). Specifically, the level L2 block with logical addresses [0,4) corresponds to the blocks with logical address ranges [0,2) and [2,4) in level L1 and the level L2 block with logical addresses [0,4) corresponds to the blocks with logical address ranges [0,2) and [2,4) in level L1.

In some embodiments, each level of the hierarchical data structure 150 includes a scaling factor with respect to the level(s) that are above and/or below it, although other scaling factors are possible and contemplated herein. The scaling factor may be represented as F[k] and may be any positive integer greater than one (1) (e.g., F[k]>1). In some embodiments, the scaling factor may be a power of two (2), which may be represented as $2^j$, for some j greater than 1. A scaling factor F[k]>1 may ensure that L=O(log(N)), where N is the number of levels in the hierarchical data structure 150.

In certain embodiments, to maintain the similar range sizes of each level of the hierarchical data structure 150 and/or the scaling factor, but to avoid spreading or splitting an unaligned range of logical addresses between different levels, an entry for a logical address range that is larger than and/or not aligned with a range size of a certain level may remain at that level, but may include an indicator, parameter, or the like indicating a length of a tail that exceeds the block size. For example, instead of breaking a range of logical addresses [1,7) into two levels (e.g., including entries of

[2,4) and [4,6) on a higher level and entries of [1,2) and [6,7) on a lower level), entries for the range may be included in the higher level and not the lower level, with indicators of the length of a tail that exceeds the range size (e.g., an entry of [2,4) in the higher level with an indicator of a "+1" tail to the left and an entry of [4,6) with an indicator of a "+1" tail to the right, making the entries equivalent to [1,4) and [4,7), or the like).

Each block in the hierarchical data structure 150 includes a reference to and/or points to the corresponding physical address or range of physical addresses included therein. For instance, logical address 4 in level L0 references/points to one (1) corresponding physical address, the logical address range [0,2) in level L1 references/points to two (2) corresponding physical addresses, and the logical address range [4,8) in level 2 references/points to four (4) corresponding physical addresses. Stated differently, level L0 (the lowest level) represents ranges including a length of one (1) shown as individual numbers from 0 to N−1, while level(s) k>0 represents ranges of logical addresses with lengths and alignments that are equal to the corresponding value of the previous level k−1 multiplied by F[k−1].

In various embodiments, the physical addresses that correspond to the logical addresses in the hierarchical data structure 150 are physically adjacent to one another. Further, logical addresses that reference and/or point to physical addresses that store continuous and/or related data may be grouped to form a range of logical addresses at a high level, as discussed elsewhere herein.

Figure 5B:
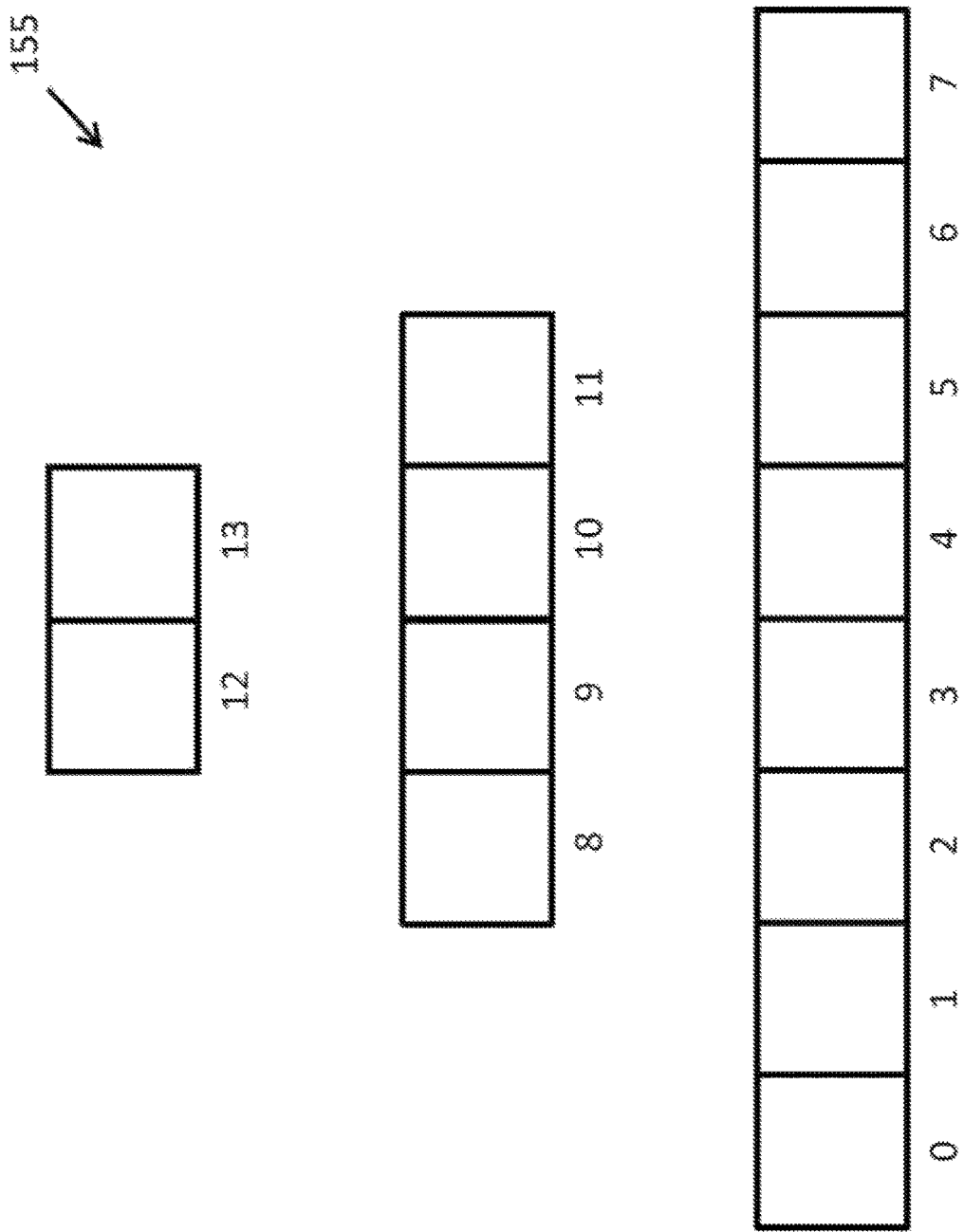

With reference to FIG. 5B, FIG. 5B is a block diagram of one embodiment of a bitmap 155 for a hierarchical data structure 150 (e.g., the embodiment depicted in FIG. 5). As shown, the bitmap 155 includes fourteen (14) reference blocks labeled 0-13, although other quantities are possible and contemplated herein. Each block in the bitmap 155 may correspond/map to a logical address or range of logical addresses. For instance, the block 4 in level L0 may correspond to logical address 4 in level L0, the block 8 in level L1 may correspond to the logical address range [0,2), and the block 13 in level L2 may correspond to the logical address range [4,8).

The blocks in the bitmap 155 may be used to validate or invalidate a logical address or logical address range. For instance, a block with a bit value of 0 or FALSE may indicate that the logical address (e.g., level L0) or logical address range (e.g., levels L1 and L2) is invalid and a bit value of 1 or TRUE may indicate that the logical address or logical address range is valid, or vice-versa.

In various embodiments, the bitmap 155 may provide an indication of the largest mapped logical address range in the hierarchical data structure 150 including a logical address. Since continuous and/or related data may be stored in adjacent physical addresses, mapping a range of logical addresses that correspond to a range of adjacent physical addresses storing the continuous and/or related data may reduce the amount of time it takes to locate a logical address, which may improve the efficiency of the system 100 compared to conventional systems. For instance, locating a logical address in level L2 takes less time and/or is more efficient than locating the logical address in levels L1 and L0. Likewise, locating a logical address in level L1 takes less time and/or is more efficient than locating the logical address in level L0.

Similarly, in certain embodiments, mapping a range of logical addresses that correspond to a range of adjacent physical addresses storing the continuous and/or related data may reduce the storage capacity used to store a level and/or mapping, so that more mappings and/or levels of the hierarchical data structure 150 may be cached in volatile memory than would be possible without compressed, range mappings, allowing the mappings and/or levels cached in volatile memory to be accessed more quickly than if they were stored in non-volatile memory. Mapping a range of logical addresses that correspond to a range of adjacent physical addresses storing the continuous and/or related data, in a further embodiment, may reduce the amount of time used to traverse the hierarchical data structure to locate a mapping, when compared to mappings of individual addresses.

In various embodiments, the lowest level (e.g., level L0) of the hierarchical data structure 150 may be stored in the non-volatile memory 120 and/or in the storage client(s) 116 and the remaining levels (e.g., levels higher than the based level) may be stored in the non-volatile memory 120 and/or in the storage client(s) 116. In additional or alternative embodiments, the bitmap 155 may be stored in the non-volatile memory 120 and/or in the storage client(s) 116. In one embodiment, the lowest level (e.g., level L0) of the hierarchical data structure 150 is stored in the non-volatile memory 120 and the remaining levels (e.g., levels higher than the based level) and the bitmap 155 are stored in the storage client(s) 116, although other configurations are possible and contemplated herein.

Figure 6A:
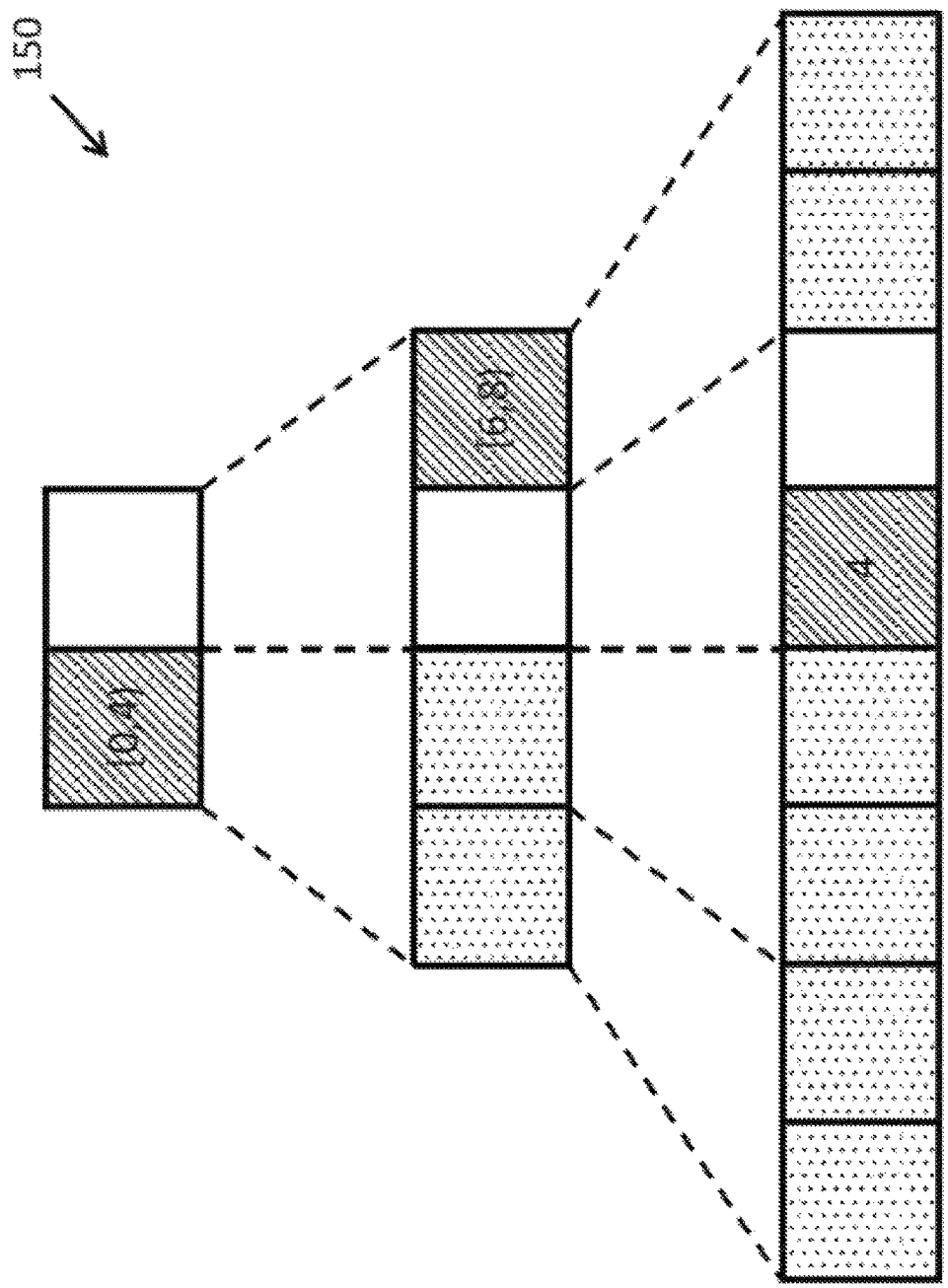

FIGS. 6A and 6B illustrate an example the hierarchical data structure 150 and the bitmap 155 at a time T0. FIGS. 7A-7B and 8A-8B illustrate various examples of the operations of the hierarchical data structure 150 and the bitmap 155 at a time T1. Further, FIGS. 9A-9B and 10A-10B illustrate various alternative examples of the operations of the hierarchical data structure 150 and the bitmap 155 at times T2 and T3, respectively, that occur subsequent to the time T2 in the example illustrated in FIGS. 8A-8B. The examples in FIGS. 6A-10B are provided for instructional purposes and/or for ease in understanding the various embodiments of the hierarchical data structure 150 and/or the bitmap 155, and are not intended to limit the scope of the technology disclosed herein in any manner.

The length (which is equal to the alignment) at a level k may be referred to as the accumulative scaling factor and may be represented as $F_A[k]$. Here, if A[k] [i] is true, it will represent a logical address range $[i*F_A[k]], (i+1)*F_A[k])$, as discussed above. Further, for any level k>0 and element A[k][i], the F[k] elements {A[k−1][i*F[k]] . . . A[k−1][(i+1)*F[k]−1]} at level k−1 may be referred to as children or child elements of element A[k][i], which in turn may be referred to as a parent element at level k. Further, children of the same parent element may be conserved sibling elements. Moreover, descendants of any element or logical address range may include its child elements and their descendants. For instance, if Y is a descendant of X, X may be considered an ancestor of Y.

The example of FIGS. 6A and 6B illustrate the state of the hierarchical data structure 150 and the bitmap 155 at time T0. In FIG. 6A, the logical address range [0,4) at level L2 of the hierarchical data structure 150 includes hashed lines, which indicates that this logical address range (e.g., logical addresses 0-3) is valid. A valid logical address range indicates that the adjacent physical addresses corresponding to the logical addresses in the element [0,4) currently store continuous and/or related data. Here, the logical address range [0,4) may be considered a parent element and an ancestor element because it includes two children or child elements, each of which includes a respective pair of child elements (e.g., descendant elements of the logical address range [0,4)), as indicated by the dashed lines between levels L2 and L1 and between levels L1 and L0.

The child elements and descendent elements of the logical address range [0,4) are dotted, which indicates that these elements are shadowed by their parent element in the case of the logical address range [0,2) and [2,4) and by their ancestor element in the case of the logical addresses 0-3. A logical address or logical address range that is shadowed indicates that each logical address included therein is part of a larger logical address range or a logical address range with a greater quantity of logical addresses at a higher level in the hierarchical data structure 150. In other words, if A[k][i]=TRUE, the value of all of the descendants of A[k][i] is equal to FALSE since a valid ancestor shadows all of its descendants. Further, a valid or TRUE element may describe the highest level in which a group or range of logical addresses represent a group or range of adjacent physical addresses currently storing continuous and/or related data.

The logical address range [6,8) also includes hashed lines, which indicates that this logical address range is valid. As such, the child elements (e.g., individual logical addresses 6 and 7) of the are shadowed logical address range [6,8) to indicate that logical addresses 6 and 7 are grouped together at a higher level (e.g., level L1) in the hierarchical data structure 150.

The logical address 4 includes hashed lines at level L0, which indicates that the physical address that corresponds to the logical address 4 does not store continuous and/or related data with the physical addresses that correspond to the logical addresses 3 and 5. The logical address 5 is open (e.g., is blank), which indicates that the physical address that corresponds to the logical address 5 is empty or is unavailable. If, in the future, the physical address that corresponds to the logical address 5 begins to store data that is not continuous and/or related to the data stored in the physical address that correspond to the logical address 4, the logical address 5 would be updated to include hashed lines.

With reference to FIG. 6B, the bit value in blocks 12, 11, and 4 are 1 or TRUE and the bit value in blocks 0-3, 5-10, and 13 are 0 or FALSE. Blocks 12, 11, and 4 include a bit value of 1 or TRUE to map the validity of the logical address ranges [0,4), [6,8), and logical address 4. Blocks 0-3, 5-10, and 13 are 0 or FALSE to map the invalidity of the logical address ranges [4,8), [0,2), [2,4), [4,6), and logical addresses 0-3 and 5-7, of which the logical address ranges [0,2), [2,4), and logical addresses 0-3 and 6-7 are being shadowed by a parent element (e.g., the logical address ranges [0,2) and [2,4)) or an ancestor element (e.g., logical addresses 0-3 and 6-7).

To locate a logical address that corresponds to a physical address, the bitmap 155 may be searched beginning from the highest level (e.g., level L2) until a block with a bit value of 1 or TRUE for the logical address is identified. An entry or mapping for a logical address may be located in a level by dividing the logical address by the scaling factor for the level, and using the result as an index to locate the associated entry or mapping at that level (e.g., and checking the bitmap 155 to determine if the entry or mapping is valid). If there is not a valid entry for a logical address in the highest level (e.g., level L2), the next highest level may be checked and so on until a valid entry is found. In this manner, the largest mapped logical address range that includes the logical address in the hierarchical data structure 150 may be identified, which may occur at a level that is higher than searching each individual logical address at level L0. Identifying the subject logical address at a higher level than the lowest or base level (e.g., level L0) decreases the amount of time it may take to locate data in the non-volatile memory 120, which allows the system 100 to operate more efficiently. Once the logical address range including the subject logical address is identified, the physical address in the non-volatile memory 120 corresponding to the subject logical address may be read to identify the physical location of the subject data.

Figure 7A:
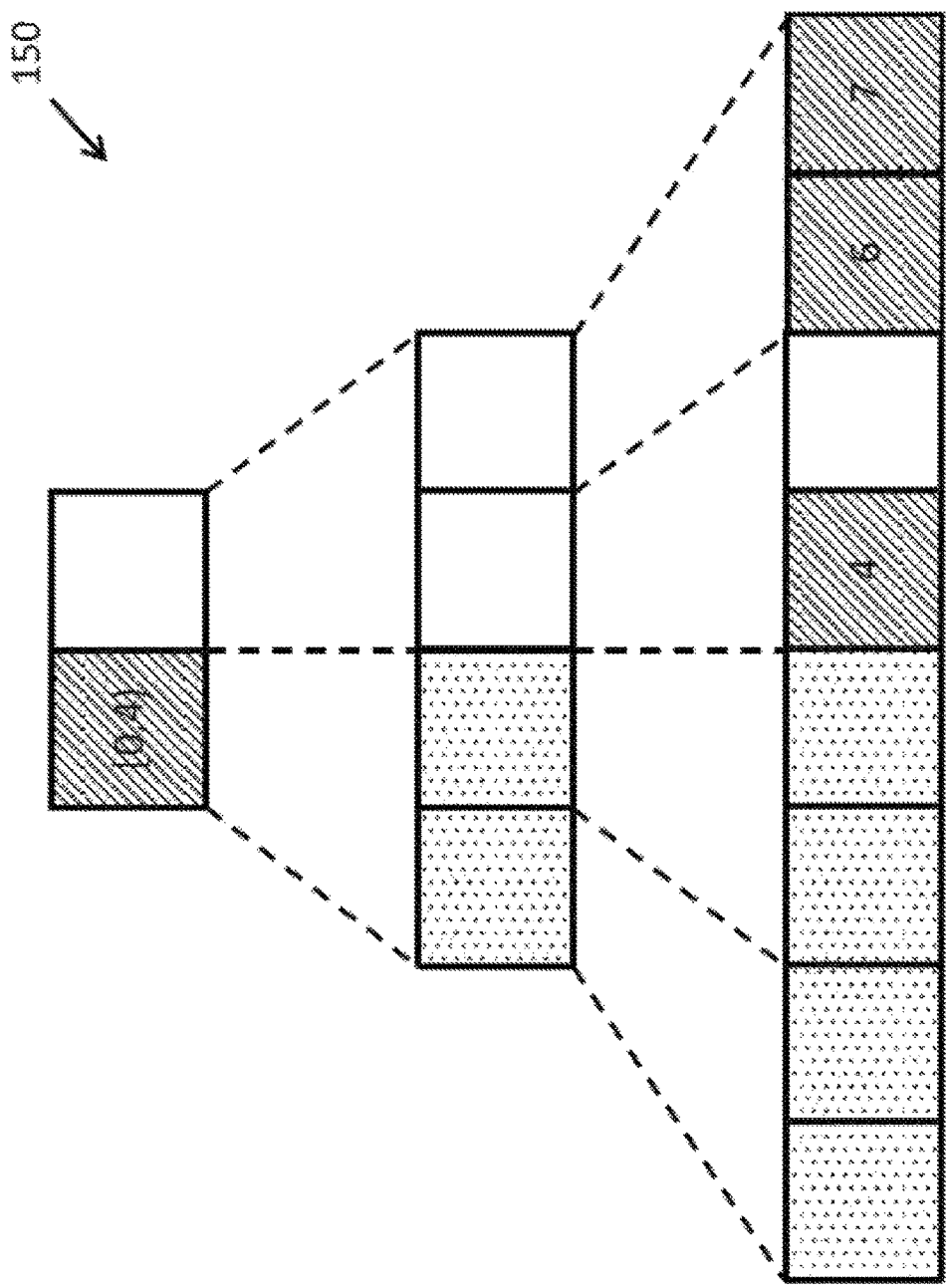
FIGS. 7A and 7B are schematic blocks illustrating one example of the hierarchical data structure and bitmap for the hierarchical data structure, respectively, at a time T1.
Figure 7B:
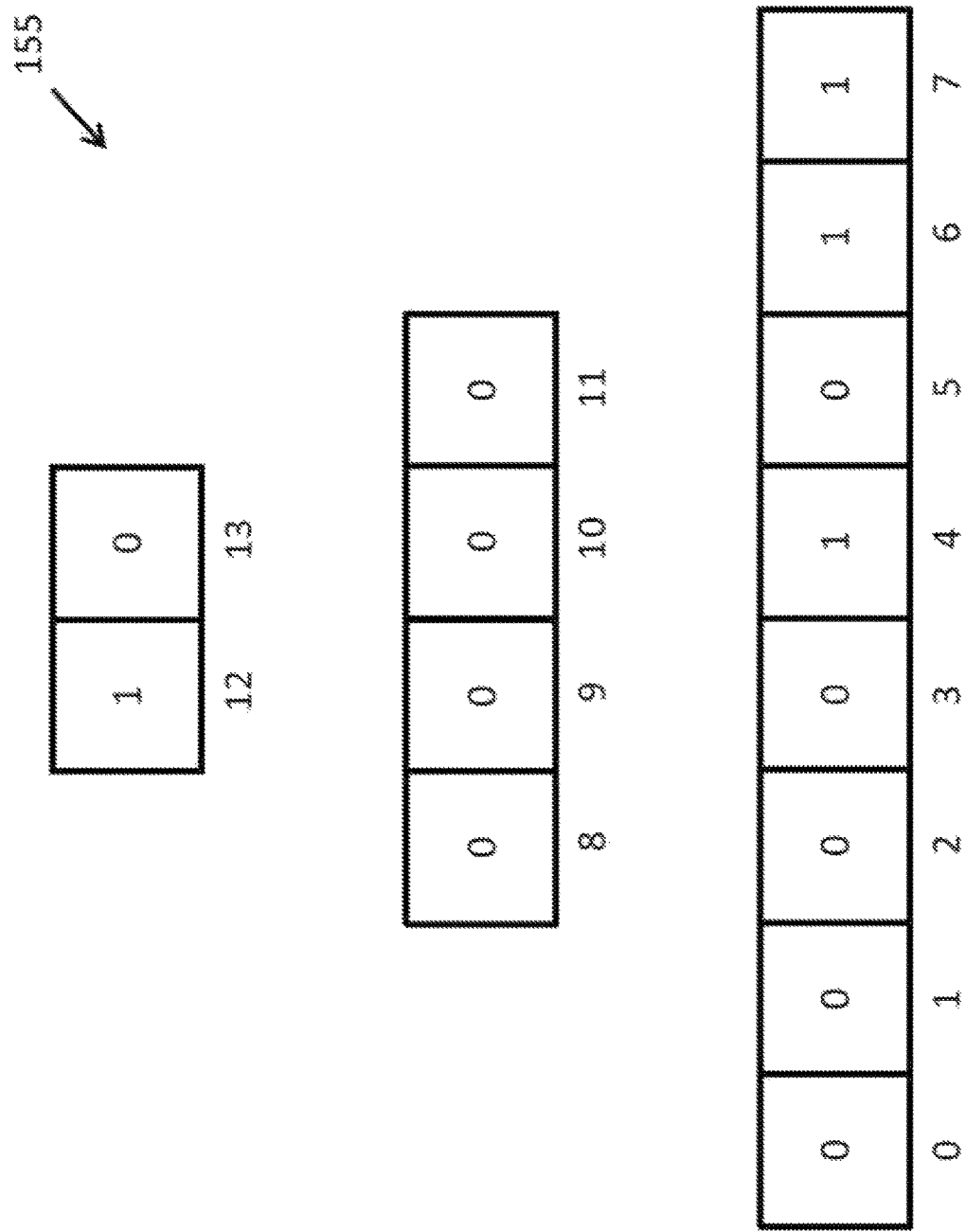

The example of FIGS. 7A and 7B illustrate the state of the hierarchical data structure 150 and the bitmap 155 at time T1. In FIG. 7A, the data in the physical address that corresponds to the logical address 6 and/or the data in the physical address that corresponds to the logical address 7 is modified, written to, and/or rewritten such that the data in these physical addresses are no longer continuous and/or related. As shown, the elements/blocks for logical addresses 6 and 7 include hashed lines to indicate that the physical addresses that correspond to the logical addresses 6 and 7 are each storing data and that the data stored therein is not continuous and/or is unrelated to one another.

FIG. 7B illustrates the updates to the bitmap 155 in response to the changes/modifications to the hierarchical data structure 150 illustrated in FIG. 7A. Here, the bit value in block 11 is changed to 0 or FALSE and the bit values in blocks 6 and 7 have been changed to 1 or TRUE. The bit values in blocks 0-5, 8-10, and 12-13 remain unchanged or the same as they were at time T0, as shown in FIG. 6B.

Figure 8A:
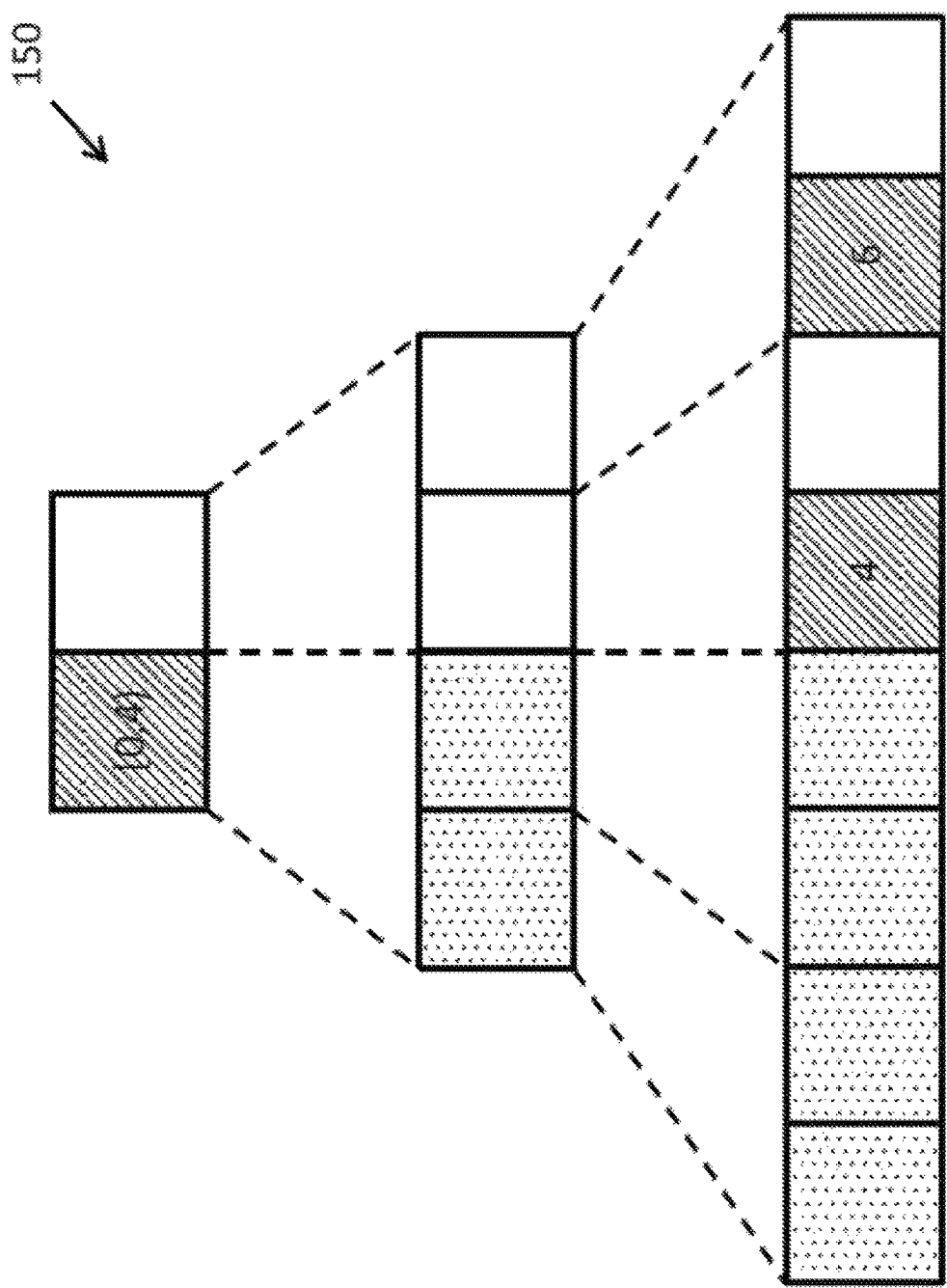
FIGS. 8A and 8B are schematic blocks illustrating another example of the hierarchical data structure and bitmap for the hierarchical data structure, respectively, at a time T1.
Figure 8B:
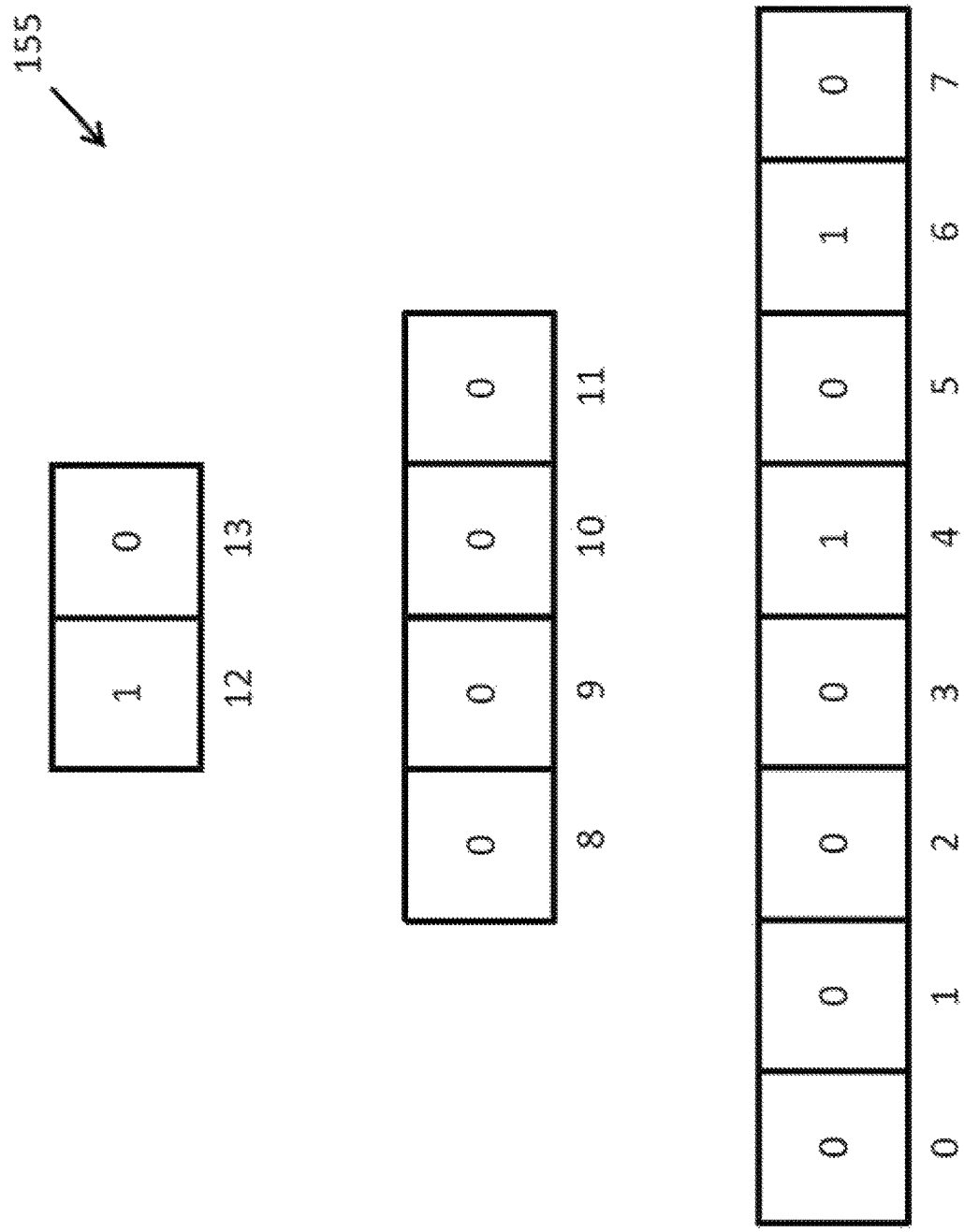

FIGS. 8A and 8B illustrate an alternative example of the state of the hierarchical data structure 150 and the bitmap 155 at time T1. In FIG. 8A, the data in the logical address 6 and/or logical address 7 is modified, removed/deleted, moved/relocated, the corresponding physical address being unavailable, and/or the corresponding physical addresses 6 and 7 otherwise not storing continuous and/or related data. In this example, the data in the physical address that corresponds to the logical address 7 is deleted or relocated such that the physical address is empty, which is indicated by the open or blank element/block for the logical address 7.

As shown, the element/block for the logical address range [6,8) that was valid at time T0 (e.g., included hashed lines at time T0) is now open or blank to indicate that this logical address range is invalid and/or no longer valid. Further, the element/block that corresponds to the logical address 6 that was shadowed at time T0 (e.g., was dotted) is updated to include hashed lines to indicate that this logical address is valid (e.g., is currently storing data) and the element/block that corresponds to the logical address 7 that was shadowed at time T0 (e.g., was dotted) is updated so that it is open/blank to indicate that it is empty or unavailable. Moreover, because the logical address 6 is valid, it may be known that the physical address that corresponds to the logical address 6 is storing data and that the data is not continuous and/or is unrelated to data stored in one or more adjacent physical addresses (e.g., the physical address/addresses that correspond to logical address 5 and/or 7).

FIG. 8B illustrates the updates to the bitmap 155 in response to the changes/modifications to the hierarchical data structure 150 illustrated in FIG. 8A. Here, the bit value in block 11 is changed to 0 or FALSE and the bit value in block 6 is changed to 1 or TRUE. The bit values in blocks 0-5, 7-10, and 12-13 remain unchanged or the same as they were at time T0, as shown in FIG. 6B.

Figure 9A:
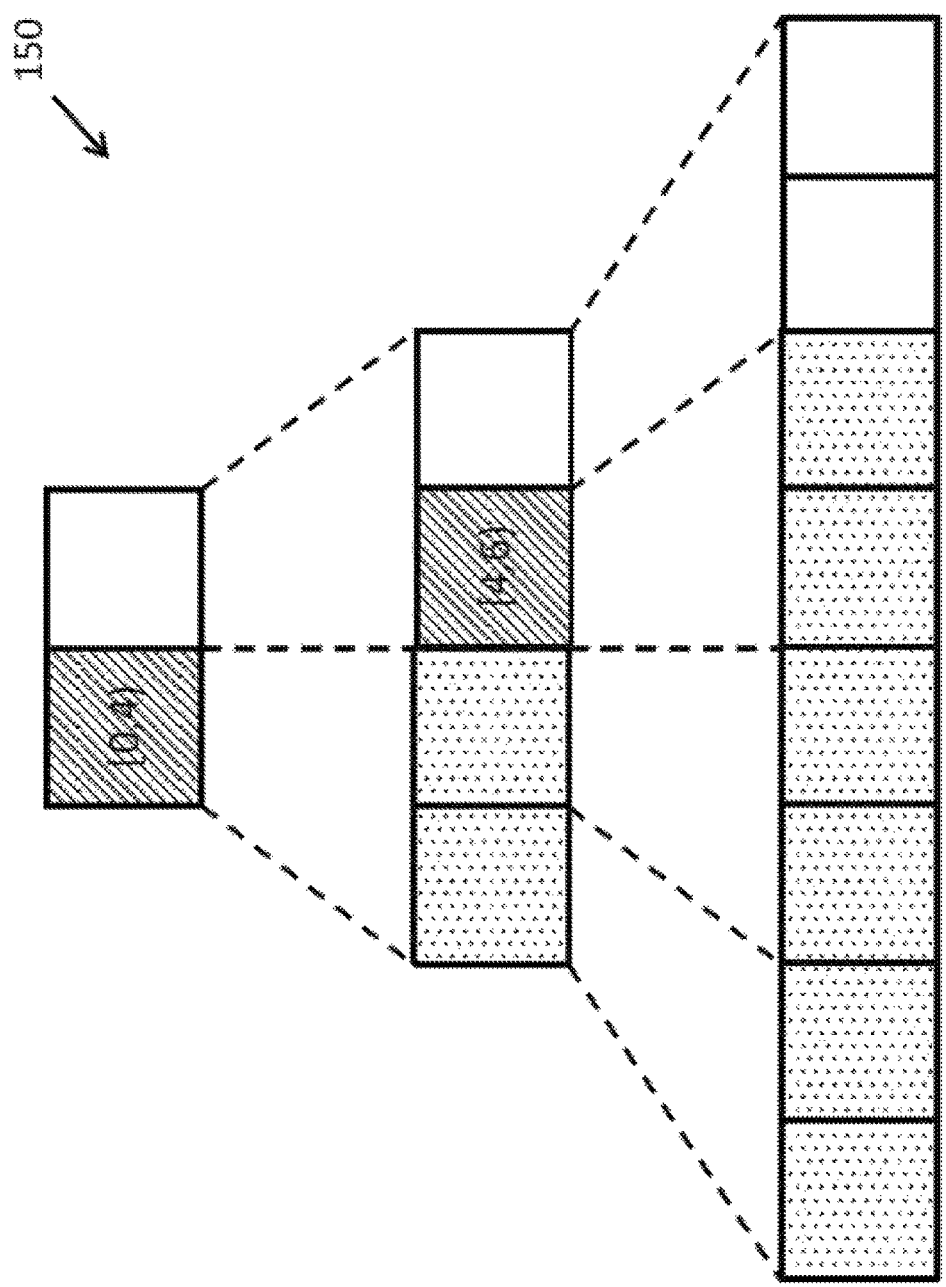
FIGS. 9A and 9B are schematic blocks illustrating one example of the hierarchical data structure and bitmap for the hierarchical data structure, respectively, at a time T2.
Figure 9B:
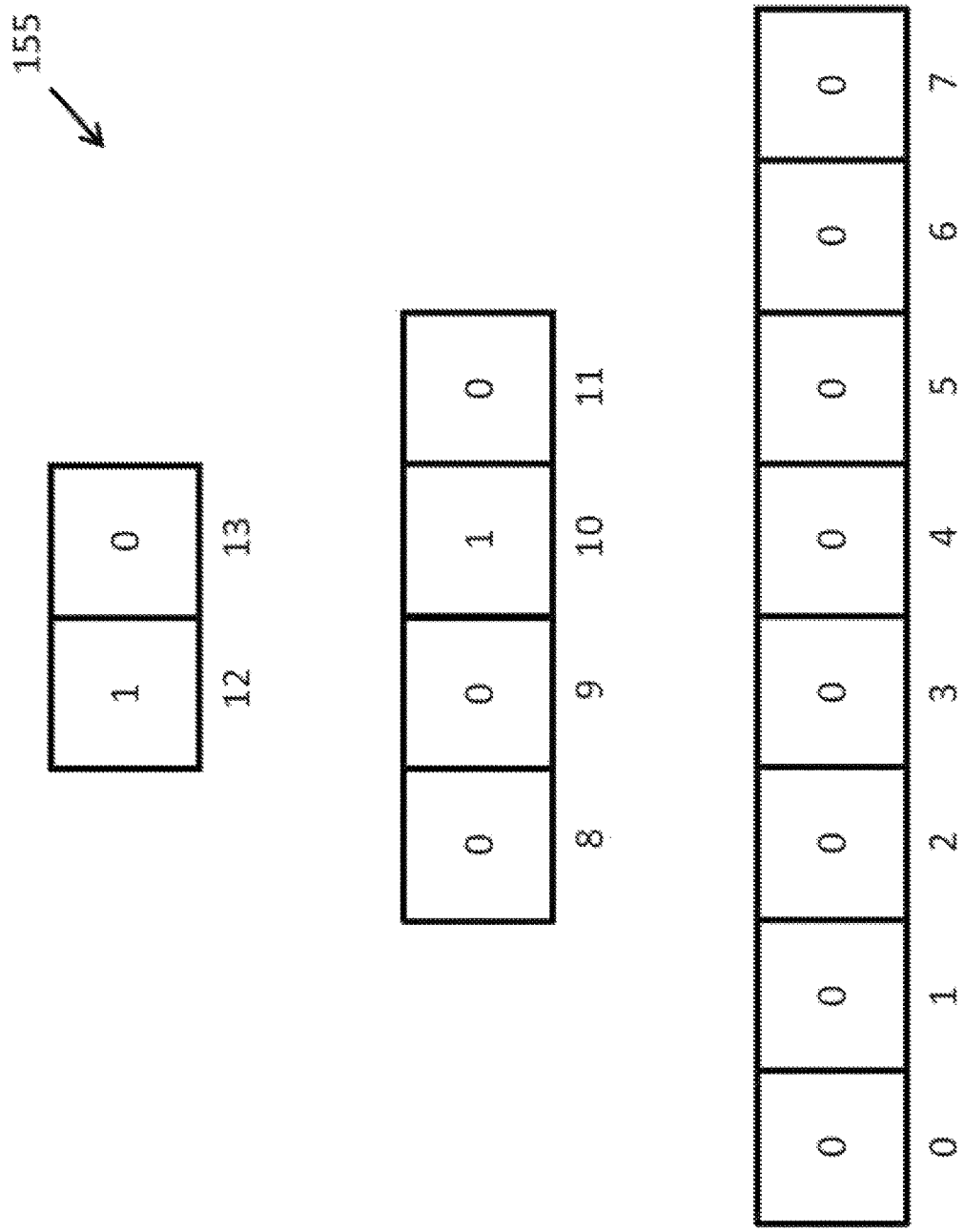

The example of FIGS. 9A and 9B illustrate the state of the hierarchical data structure 150 and the bitmap 155 at a time T2 that is subsequent to the time T1 in FIG. 8A and in response to data in the physical address that corresponds to the logical address 6 is continuous and/or related to the data in the physical address that corresponds to the logical address 4 and the data in the physical address that corresponds to the logical address 6 is moved/relocated to the physical address that corresponds to the logical address 5. In FIG. 9A the hierarchical data structure 150 is updated to indicate that the logical address range [6,8) is valid, the logical addresses 4 and 5 are shadowed, and the logical address 6 is open/empty.

FIG. 9B illustrates the updates to the bitmap 155 in response to the changes/modifications to the hierarchical data structure 150 illustrated in FIG. 9A. Here, the bit value in block 10 is changed to 1 or TRUE and the bit value in blocks 4 and 5 have been changed to 0 or FALSE because the logical addresses 4 and 5 are being shadowed by their parent element/block. Further, the bit value for block 6 is changed to 0 or FALSE because the logical address 6 is open/blank in response to its corresponding physical address being empty and/or unavailable. The bit values for blocks 0-3, 7-9, and 11-13 remain unchanged or the same as they were at time T1, as shown in FIG. 8B.

Figure 10A:
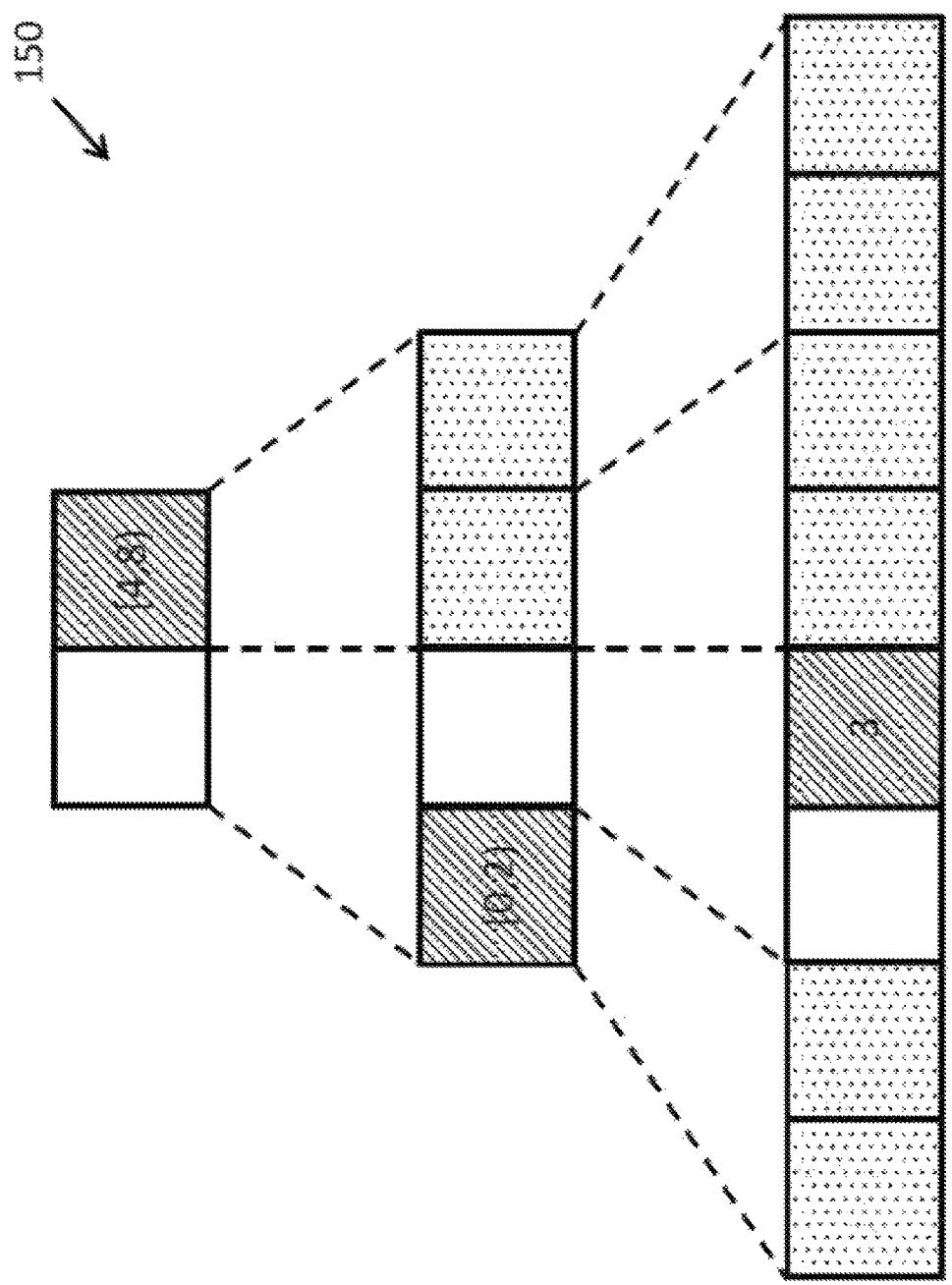
FIGS. 10A and 10B are schematic blocks illustrating one example of the hierarchical data structure and bitmap for the hierarchical data structure, respectively, at a time T3.
Figure 10B:
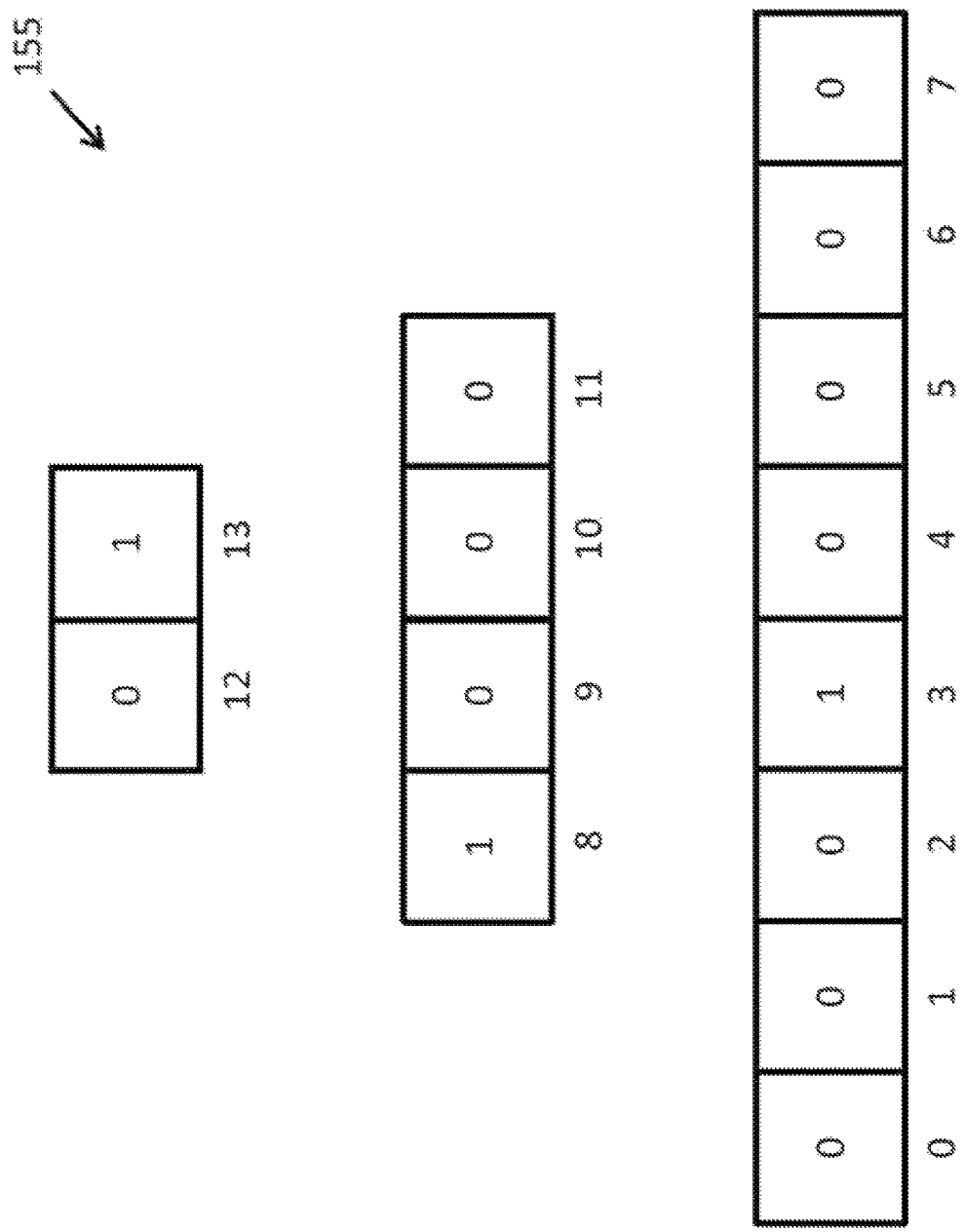

The example of FIGS. 10A and 10B illustrate the state of the hierarchical data structure 150 and the bitmap 155 at a time T3. In FIG. 10A, the hierarchical data structure 150 is updated in response to data in the physical addresses that correspond to the logical addresses 6 and 7 being written to include data that is continuous and/or related to one another and to the data in the physical addresses that correspond to the logical addresses 4 and 5. Here, because the physical addresses that correspond to the logical addresses 4-7 currently stored continuous and/or related data, their corresponding logical addresses may be group together in the logical address range [4,8) in level 2 of the hierarchical data structure 150.

Further illustrated in FIG. 10A, the data in the physical address that corresponds to the logical address 2 is deleted/moved and/or is otherwise no longer storing data that is continuous and/or related to the physical addresses that correspond to the logical addresses 1 and 3. Here, the hierarchical data structure 150 is updated to indicate that the logical address range [0,4) in level L2 is no longer valid (e.g., is open/blank), the logical address range [0,2) in level L1 is valid (e.g., includes hashed lines), the logical address 3 is valid (e.g., includes hashed lines), and the logical address 2 is open/empty (and the logical addresses 0 and 1 remain shadowed).

FIG. 10B illustrates the updates to the bitmap 155 in response to the changes/modifications to the hierarchical data structure 150 illustrated in FIG. 10A. Here, the bit value in block 12 is changed to 0 or FALSE, the bit value in block 8 is changed to 1 or TRUE, and the bit value in block 3 is changed to 1 or TRUE. The bit value in blocks 4 and 5 remain unchanged (e.g., 0 or FALSE) because the logical addresses 0 and 1 are still being shadowed by an ancestor element/block and the bit value in the logical address 2 remains unchanged because the physical address that corresponds to the logical address is now empty/unavailable instead of being shadowed by an ancestor element/block. The bit values for blocks 4-7, 9, and 11 remain unchanged or the same as they were at time T2, as shown in FIG. 9B, the difference being that blocks 6-7 and 11 are now shadowed by an ancestor block/element and block 9 is now open/blank instead of being shadowed.

Figure 11:
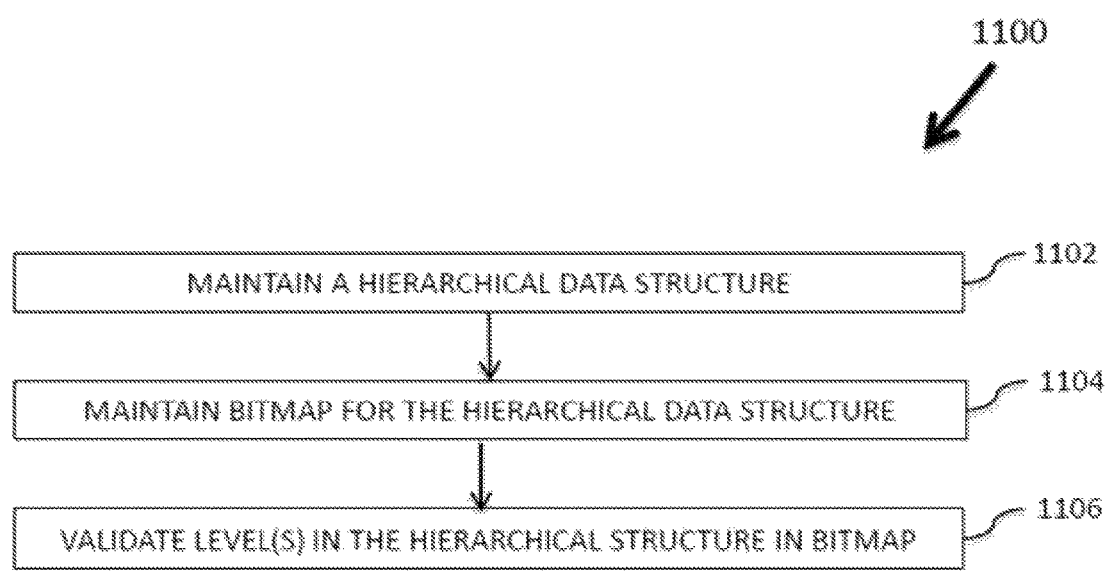
FIG. 11 is a schematic flow chart diagram illustrating one embodiment of a method of logical address range mapping for storage devices.

With reference to FIG. 11, FIG. 11 is a schematic flow chart diagram illustrating one embodiment of a method 1100 for logical address range mapping for storage devices. At least in the illustrated embodiment, method 1100 begins by a processing device maintaining a hierarchical data structure 150 (block 1102). The hierarchical data structure 150 may include one or more of the embodiments of the hierarchical data structure 150 including multiple levels, as discussed elsewhere herein.

The processing device may further maintain a bitmap 155 for the hierarchical data structure 150 (block 1104). The bitmap 155 may include one or more of the embodiments of the bitmap 155, as discussed elsewhere herein. In some embodiments, the bitmap 155 tracks the validity of entries mapping logical address ranges to the physical addresses at each of the levels of the hierarchical data structure 150. In additional or alternative embodiments, the bit map 155 may track and/or be used to determine the largest mapped logical address ranges for the logical addresses in the levels of the hierarchical data structure 150. In further embodiments, the processing device may generate each level of the hierarchical data structure 150 to include a range of logical addresses including a level range size equal to a sum of each range size in an adjacent lower level of the hierarchical data structure 150.

The processing device may validate, in the bitmap 155, one or more levels of the hierarchical data structure 150 to reflect a largest mapped logical address range for a logical address in the plurality of levels, as discussed elsewhere herein (block 1106). In one embodiment, a level includes one or more mappings between logical address ranges and physical address ranges at a range size for the levels. Further, a mapped logical address range may be based on a continuity of data stored in a physical address range corresponding to the mapped logical address range.

In some embodiments, the processing device may invalidate or shadow each mapped logical address range below the largest mapped logical address range for a subject logical address. Further, an invalidated mapped logical address may correspond to a physical address that is empty and/or a physical address that stores data that is discontinuous with data stored in adjacent physical addresses. A shadowed mapped logical address is mapped in a higher level.

Figure 12:
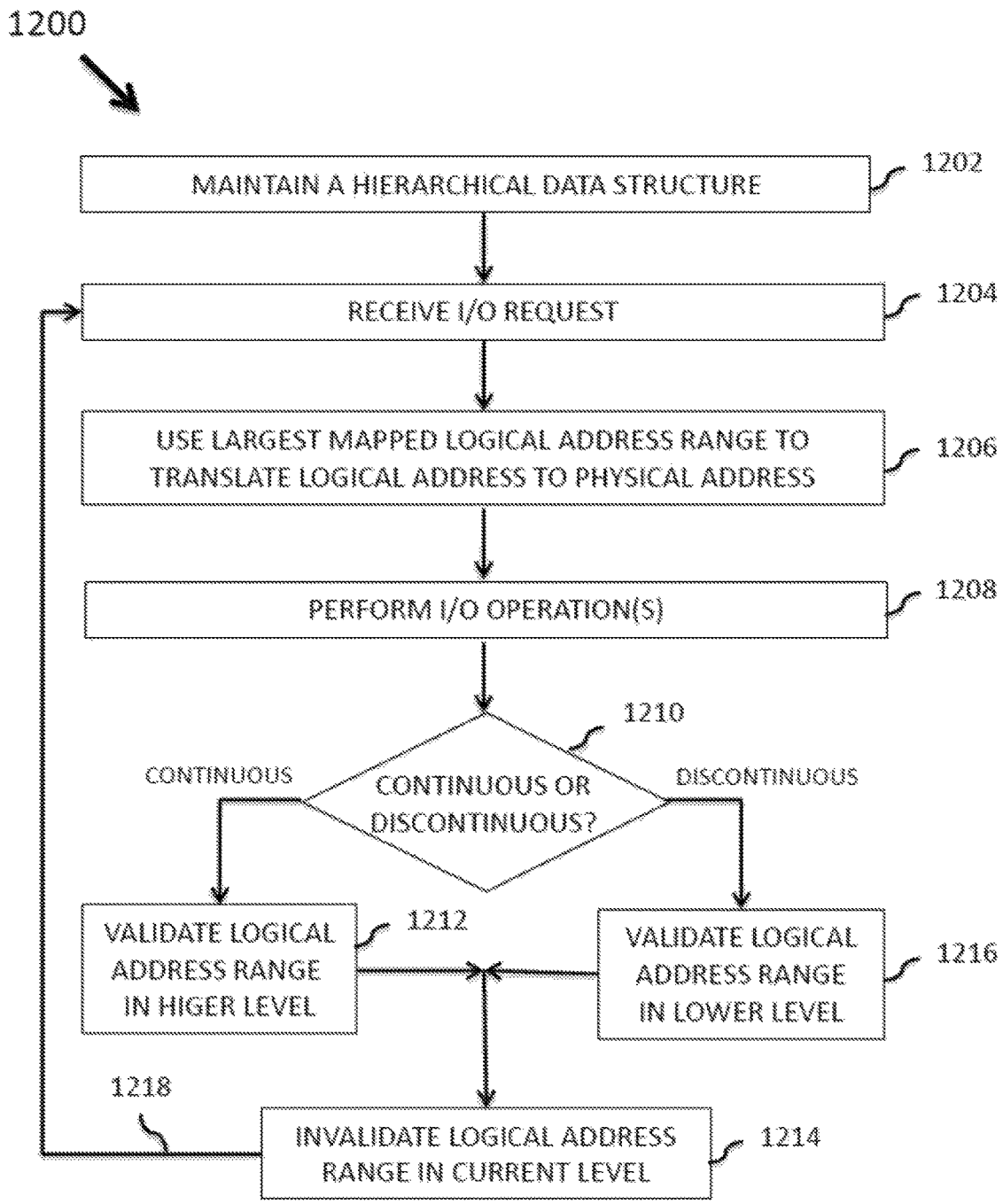
FIG. 12 is a schematic flow chart diagram illustrating another embodiment of a method of logical address range mapping for storage devices.

Referring to FIG. 12, another embodiment of a method 1200 for logical address range mapping for storage devices is provided. At least in the illustrated embodiment, method 1200 may begin by a processing device maintaining a hierarchical data structure 150 including multiple levels for mapping logical addresses to a set of physical address (block 1202).

The processing device may receive an I/O request (block 1204) and translate a logical address for the I/O request to a physical address utilizing a largest mapped logical address range that includes the logical address in the hierarchical data structure 150 (block 1206). In various embodiments, the processing device performs I/O operation(s) corresponding to the I/O request that modify/write data to the physical address (block 1208) and determine if data in the physical address is now continuous or discontinuous with data in one or more adjacent physical addresses (block 1210).

In response to the data becoming continuous with the data in one or more adjacent physical addresses, the processing device may validate a logical address range in a higher level of the hierarchical data structure 150 (block 1212) and invalidate and/or shadow the logical address range in the current level of the hierarchical data structure 150 (block 1214). In response to the data becoming discontinuous with the data in one or more adjacent physical addresses, the processing device may validate and/or unshadow a logical address range in a lower level of the hierarchical data structure 150 (block 1216) and invalidate a logical address range in the current level of the hierarchical data structure 150 (block 1214). The processing device may receive a subsequent I/O request and perform the operations of blocks 1204 through 1216 (return 1218). In cases where the data has not become continuous or discontinuous in the determination at block 1210, the processing device may skip the operations of blocks 1212, 1214, and 1216, returning 1218 to receive a subsequent I/O request.

The following examples are made with reference to FIG. 12 may assist in understanding the various embodiments disclosed herein. This example is for instructional purposes and/or for ease in understanding the various embodiments and is not intended to limit the scope of the technology disclosed herein in any manner.

Example 1

Beginning in block 1210 of FIG. 12, in response to the I/O operation(s) modifying data stored in the physical address such that the data is no longer continuous or discontinuous with data stored in one or more adjacent physical addresses with respect to the physical address at a current level, the processing device may update the hierarchical data structure 150 to include a largest mapped logical address range corresponding to the physical address in a lower level of the hierarchical data structure 150 with respect to the current level (block 1216) and invalidate the logical address range at the current level (block 1214).

Example 2

Beginning in block 1210 of FIG. 12, in response to the I/O operation(s) modifying data stored in the physical address such that the data is no longer continuous or discontinuous with data stored in one or more adjacent physical addresses with respect to the physical address at a current level, the processing device may update the hierarchical data structure 150 to include a largest mapped logical address range corresponding to the physical address in a lower level of the hierarchical data structure 150 with respect to the current level (block 1216) and invalidate the logical address range at the current level (block 1214).

The processing device may receive a subsequent I/O request (return 1218 and block 1204) and, responsive to the I/O request, perform the operations of blocks 1206 and 1208. In response to the further I/O operation(s) modifying data stored in the physical address such that the data is no longer continuous or discontinuous with data stored in one or more adjacent physical addresses with respect to the physical address at the lower level, the processing device may update the hierarchical data structure 150 to include a largest mapped logical address range corresponding to the physical address in a further lower level of the hierarchical data structure 150 with respect to the current level (block 1216) and invalidate the logical address range at the current level (block 1214).

Example 3

Beginning in block 1210 of FIG. 12, in response to the I/O operation(s) modifying data stored in the physical address such that the data is no longer continuous or discontinuous with data stored in one or more adjacent physical addresses with respect to the physical address at a current level, the processing device may update the hierarchical data structure 150 to include a largest mapped logical address range corresponding to the physical address in a lower level of the hierarchical data structure 150 with respect to the current level (block 1216) and invalidate the logical address range at the current level (block 1214).

The processing device may receive a subsequent I/O request (return 1218 and block 1204) and, responsive to the I/O request, perform the operations of blocks 1206 and 1208. In response to the subsequent I/O operation(s) modifying data stored in the physical address such that the data is no longer continuous or discontinuous with data stored in one or more adjacent physical addresses with respect to the physical address at the lower level, the processing device may update the hierarchical data structure 150 to include a largest mapped logical address range corresponding to the physical address in a further lower level of the hierarchical data structure 150 with respect to the current level (block 1216) and invalidate the logical address range at the current level (block 1214).

The processing device may receive a further subsequent I/O request (return 1218 and block 1204) and, responsive to the I/O request, perform the operations of blocks 1206 and 1208. In response to the further subsequent I/O operation(s) modifying data stored in the physical address such that the data is continuous with data stored in one or more adjacent physical addresses with respect to the physical address at the further lower level, the processing device may update the hierarchical data structure 150 to include a largest mapped logical address range corresponding to the physical address in a higher level of the hierarchical data structure 150 with respect to the further lower level (block 1212) and invalidate the logical address range at the current level (block 1214). Here, the higher level may be the same level as the previous lower level or a different level.

Example 4

Beginning in block 1210 of FIG. 12, in response to the I/O operation(s) modifying data stored in the physical address such that the data is no longer continuous or discontinuous with data stored in one or more adjacent physical addresses with respect to the physical address at a current level, the processing device may update the hierarchical data structure 150 to include a largest mapped logical address range corresponding to the physical address in a lower level of the hierarchical data structure 150 with respect to the current level (block 1216) and invalidate the logical address range at the current level (block 1214).

The processing device may receive a subsequent I/O request (return 1218 and block 1204) and, responsive to the I/O request, perform the operations of blocks 1206 and 1208. In response to the subsequent I/O operation(s) modifying data stored in the physical address such that the data is continuous with data stored in one or more adjacent physical addresses with respect to the physical address at the lower level, the processing device may update the hierarchical data structure 150 to include a largest mapped logical address range corresponding to the physical address in a higher level of the hierarchical data structure 150 with respect to the further lower level (block 1216) and invalidate the logical address range at the current level (block 1214). Here, the higher level may be the same level as the previous current level or a different level.

Example 5

Beginning in block 1210 of FIG. 12, in response to the I/O operation(s) modifying data stored in the physical address such that the data is no longer continuous or discontinuous with data stored in one or more adjacent physical addresses with respect to the physical address at a current level, the processing device may update the hierarchical data structure 150 to include a largest mapped logical address range corresponding to the physical address in a lower level of the hierarchical data structure 150 with respect to the current level (block 1216) and invalidate the logical address range at the current level (block 1214).

The processing device may receive a subsequent I/O request (return 1218 and block 1204) and, responsive to the I/O request, perform the operations of blocks 1206 and 1208. In response to the subsequent I/O operation(s) modifying data stored in the physical address such that the data is continuous with data stored in one or more adjacent physical addresses with respect to the physical address at the lower level, the processing device may update the hierarchical data structure 150 to include a largest mapped logical address range corresponding to the physical address in a higher level of the hierarchical data structure 150 with respect to the further lower level (block 1216) and invalidate the logical address range at the current level (block 1214). Here, the higher level may be the same level as the previous current level or a different level.

The processing device may receive a further subsequent I/O request (return 1218 and block 1204) and, responsive to the I/O request, perform the operations of blocks 1206 and 1208. In response to the further subsequent I/O operation(s) modifying data stored in the physical address such that the data is no longer continuous or discontinuous with data stored in one or more adjacent physical addresses with respect to the physical address at the higher/current level, the processing device may update the hierarchical data structure 150 to include a largest mapped logical address range corresponding to the physical address in a lower level of the hierarchical data structure 150 with respect to the higher/current level (block 1216) and invalidate the logical address range at the current level (block 1214). Here, the lower level may be the same level as the previous higher level or a different level.

Example 6

Beginning in block 1210 of FIG. 12, in response to the I/O operation(s) modifying data stored in the physical address such that the data is continuous with data stored in one or more adjacent physical addresses with respect to the physical address at a current level, the processing device may update the hierarchical data structure 150 to include a largest mapped logical address range corresponding to the physical address in a higher level of the hierarchical data structure 150 with respect to the current level (block 1212) and invalidate the logical address range at the current level (block 1214).

Example 7

Beginning in block 1210 of FIG. 12, in response to the I/O operation(s) modifying data stored in the physical address such that the data is continuous with data stored in one or more adjacent physical addresses with respect to the physical address at a current level, the processing device may update the hierarchical data structure 150 to include a largest mapped logical address range corresponding to the physical address in a higher level of the hierarchical data structure 150 with respect to the current level (block 1212) and invalidate the logical address range at the current level (block 1214).

The processing device may receive a subsequent I/O request (return 1218 and block 1204) and, responsive to the I/O request, perform the operations of blocks 1206 and 1208. In response to the subsequent I/O operation(s) modifying data stored in the physical address such that the data is continuous with data stored in one or more adjacent physical addresses with respect to the physical address at the higher level, the processing device may update the hierarchical data structure 150 to include a largest mapped logical address range corresponding to the physical address in a further higher level of the hierarchical data structure 150 with respect to the current level (block 1212) and invalidate the logical address range at the current level (block 1214).

Example 8

Beginning in block 1210 of FIG. 12, in response to the I/O operation(s) modifying data stored in the physical address such that the data is continuous with data stored in one or more adjacent physical addresses with respect to the physical address at a current level, the processing device may update the hierarchical data structure 150 to include a largest mapped logical address range corresponding to the physical address in a higher level of the hierarchical data structure 150 with respect to the current level (block 1212) and invalidate the logical address range at the current level (block 1214).

The processing device may receive a subsequent I/O request (return 1218 and block 1204) and, responsive to the I/O request, perform the operations of blocks 1206 and 1208. In response to the subsequent I/O operation(s) modifying data stored in the physical address such that the data is continuous with data stored in one or more adjacent physical addresses with respect to the physical address at the higher level, the processing device may update the hierarchical data structure 150 to include a largest mapped logical address range corresponding to the physical address in a further higher level of the hierarchical data structure 150 with respect to the current level (block 1212) and invalidate the logical address range at the current level (block 1214).

The processing device may receive a further subsequent I/O request (return 1218 and block 1204) and, responsive to the I/O request, perform the operations of blocks 1206 and 1208. In response to the further subsequent I/O operation(s) modifying data stored in the physical address such that the data is no longer continuous or discontinuous with data stored in one or more adjacent physical addresses with respect to the physical address at the further higher level, the processing device may update the hierarchical data structure 150 to include a largest mapped logical address range corresponding to the physical address in a lower level of the hierarchical data structure 150 with respect to the current level (block 1212) and invalidate the logical address range at the current level (block 1214). Here, the lower may be the same level or a different level than the previous higher level.

Example 9

Beginning in block 1210 of FIG. 12, in response to the I/O operation(s) modifying data stored in the physical address such that the data is continuous with data stored in one or more adjacent physical addresses with respect to the physical address at a current level, the processing device may update the hierarchical data structure 150 to include a largest mapped logical address range corresponding to the physical address in a higher level of the hierarchical data structure 150 with respect to the current level (block 1212) and invalidate the logical address range at the current level (block 1214).

The processing device may receive a subsequent I/O request (return 1218 and block 1204) and, responsive to the subsequent I/O request, perform the operations of blocks 1206 and 1208. In response to the subsequent I/O operation(s) modifying data stored in the physical address such that the data is no longer continuous or discontinuous with data stored in one or more adjacent physical addresses with respect to the physical address at the higher level, the processing device may update the hierarchical data structure 150 to include a largest mapped logical address range corresponding to the physical address in a lower level of the hierarchical data structure 150 with respect to the current level (block 1212) and invalidate the logical address range at the current level (block 1214). Here, the lower may be the same level or a different level than the previous higher/current level.

The processing device may receive a further subsequent I/O request (return 1218 and block 1204) and, responsive to the further subsequent I/O request, perform the operations of blocks 1206 and 1208. In response to the further subsequent I/O operation(s) modifying data stored in the physical address such that the data is continuous with data stored in one or more adjacent physical addresses with respect to the physical address at the lower/current level, the processing device may update the hierarchical data structure 150 to include a largest mapped logical address range corresponding to the physical address in a higher level of the hierarchical data structure 150 with respect to the current level (block 1212) and invalidate the logical address range at the current level (block 1214). Here, the higher level may be the same level or a different level than the previous higher level.

A means for maintaining a hierarchical data structure 150, in various embodiments, may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for maintaining a hierarchical data structure 150.

A means for maintaining a bitmap 155 for the hierarchical data structure 150, in certain embodiments, may include one or more of a hierarchical data structure 150, a compensation circuit 502, a command circuit 504, a lock circuit 506, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for maintaining a bitmap 155 for the hierarchical data structure 150.

A means for validating, in the bitmap 155, a level of the hierarchical data structure 150 to reflect a largest mapped logical address range for a logical address in the levels, in some embodiments, may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for validating in the bitmap 155 a level of the hierarchical data structure 150 to reflect a largest mapped logical address range for a logical address in the levels.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
    a set of non-volatile memory elements accessible using a set of physical addresses; and
    a controller for the set of non-volatile memory elements, the controller configured to:
        maintain a hierarchical data structure comprising a plurality of levels for mapping logical addresses to the set of physical addresses, each of the levels comprising one or more mappings between logical address ranges and physical address ranges at a range size for the plurality of levels;
        receive an input/output (I/O) request; and
        translate a logical address for the I/O request to a physical address utilizing a largest mapped logical address range that includes the logical address in the hierarchical data structure.

2. The system of claim 1, wherein the controller is further configured to update the hierarchical data structure to include a different largest mapped logical address range corresponding to the physical address in a lower level of the hierarchical data structure with respect to the current level, in response to the I/O request modifying first data stored in the physical address such that the first data is no longer continuous with second data stored in one or more adjacent physical addresses with respect to the physical address at a current level, the lower level including a smaller range size than the current level.

3. The system of claim 2, wherein the controller is further configured to update the hierarchical data structure to include a second different largest mapped logical address range corresponding to the one or more adjacent physical addresses in a second lower level of the hierarchical data structure with respect to the current level, in response to the hierarchical data structure including the different largest mapped logical address range, the lower level and the second lower level being different lower levels, and the second lower level including a second smaller range size than the lower level.

4. The system of claim 2, wherein the controller is further configured to:
    receive a second I/O request that modifies the first data such that the first data is continuous with third data stored in one or more second adjacent physical addresses with respect to the physical address at the lower level; and
    in response to the second I/O request, update the hierarchical data structure to include a second different largest mapped logical address range corresponding to the physical address in a higher level of the hierarchical data structure with respect to the lower level, wherein the higher level and the current level are one of a same level and different levels.

5. The system of claim 1, wherein the controller is further configured to update the hierarchical data structure to include a different largest mapped logical address range corresponding to the physical address in a higher level of the hierarchical data structure with respect to the current level, in response to the I/O request modifying first data stored in the physical address such that the first data is continuous with second data stored in one or more adjacent physical addresses with respect to the physical address at a current level, the higher level including a larger range size than the current level.

6. The system of claim 5, wherein the controller is further configured to update the hierarchical data structure to include a second different largest mapped logical address range corresponding to the one or more adjacent physical addresses in a second higher level of the hierarchical data structure with respect to the current level, in response to the hierarchical data structure including the different largest mapped logical address range, the higher level and the second higher level being different higher levels, and the second higher level including a second larger range size than the higher level.

7. The system of claim 5, wherein the controller is further configured to:
receive a second I/O request that modifies the first data such that the first data is no longer continuous with third data stored in one or more second adjacent physical addresses with respect to the physical address at the higher level; and
in response to the second I/O request, update the hierarchical data structure to include a second different largest mapped logical address range corresponding to the physical address in a lower level of the hierarchical data structure with respect to the higher level,
wherein the lower level and the current level are one of a same level and different levels.

8. The system of claim 1, the controller further configured to maintain a bitmap for the hierarchical data structure, the bitmap configured to track largest mapped logical address ranges for the logical addresses in the plurality of levels of the bit map.

9. The system of claim 1, wherein:
the I/O request modifies the hierarchical data structure according to a logical address corresponding to the physical address; and
the controller is further configured to modify the bit map to reflect a different largest mapped logical address range in the hierarchical data structure for the logical address corresponding to the physical address.

10. The system of claim 1, wherein at least one of the one or more mappings of the hierarchical data structure comprises an indicator of a length of a tail of an associated logical address range that exceeds the range size for an associated level of the plurality of levels.

11. The system of claim 1, further comprising:
a long-term non-volatile memory including a first portion of the hierarchical data structure; and
a non-volatile memory including a second portion of the hierarchical data structure.

12. The system of claim 11, further comprising:
a bit map for the hierarchical data structure, the bit map configured to track largest mapped logical address ranges for the plurality of levels, wherein:
the non-volatile memory stores the bit map;
the first portion of the hierarchical data structure includes a lowest level including a smallest range size; and
the second portion of the hierarchical data structure includes one or more levels higher than the lowest level.

13. An apparatus comprising:
means for maintaining a hierarchical data structure comprising a plurality of levels for mapping logical addresses to a set of physical addresses, each of the levels comprising one or more mappings between logical address ranges and physical address ranges at a range size for the plurality of levels;
means for receiving an input/output (I/O) request; and
means for translating a logical address for the I/O request to a physical address utilizing a largest mapped logical address range that includes the logical address in the hierarchical data structure.

14. The apparatus of claim 13, further comprising means for updating the hierarchical data structure to include a different largest mapped logical address range corresponding to the physical address in a lower level of the hierarchical data structure with respect to the current level, in response to the I/O request modifying first data stored in the physical address such that the first data is no longer continuous with second data stored in one or more adjacent physical addresses with respect to the physical address at a current level, the lower level including a smaller range size than the current level.

15. The apparatus of claim 14, further comprising means for updating the hierarchical data structure to include a second different largest mapped logical address range corresponding to the one or more adjacent physical addresses in a second lower level of the hierarchical data structure with respect to the current level, in response to the hierarchical data structure including the different largest mapped logical address range, the lower level and the second lower level being different lower levels, and the second lower level including a second smaller range size than the lower level.

16. The apparatus of claim 14, further comprising:
means for receiving a second I/O request that modifies the first data such that the first data is continuous with third data stored in one or more second adjacent physical addresses with respect to the physical address at the lower level; and
means for, in response to the second I/O request, updating the hierarchical data structure to include a second different largest mapped logical address range corresponding to the physical address in a higher level of the hierarchical data structure with respect to the lower level,
wherein the higher level and the current level are one of a same level and different levels.

17. A method comprising:
- maintaining a hierarchical data structure comprising a plurality of levels for mapping logical addresses to a set of physical addresses, each of the levels comprising one or more mappings between logical address ranges and physical address ranges at a range size for the plurality of levels;
- receiving an input/output (I/O) request; and
- translating a logical address for the I/O request to a physical address utilizing a largest mapped logical address range that includes the logical address in the hierarchical data structure.

18. The method of claim 17, further comprising updating the hierarchical data structure to include a different largest mapped logical address range corresponding to the physical address in a lower level of the hierarchical data structure with respect to the current level, in response to the I/O request modifying first data stored in the physical address such that the first data is no longer continuous with second data stored in one or more adjacent physical addresses with respect to the physical address at a current level, the lower level including a smaller range size than the current level.

19. The method of claim 18, further comprising updating the hierarchical data structure to include a second different largest mapped logical address range corresponding to the one or more adjacent physical addresses in a second lower level of the hierarchical data structure with respect to the current level, in response to the hierarchical data structure including the different largest mapped logical address range, the lower level and the second lower level being different lower levels, and the second lower level including a second smaller range size than the lower level.

20. The method of claim 18, further comprising:
- receiving a second I/O request that modifies the first data such that the first data is continuous with third data stored in one or more second adjacent physical addresses with respect to the physical address at the lower level; and
- in response to the second I/O request, updating the hierarchical data structure to include a second different largest mapped logical address range corresponding to the physical address in a higher level of the hierarchical data structure with respect to the lower level,
- wherein the higher level and the current level are one of a same level and different levels.

* * * * *